US011954163B2

(12) United States Patent
Khanna et al.

(10) Patent No.: US 11,954,163 B2
(45) Date of Patent: Apr. 9, 2024

(54) EVENT-DRIVEN CONTENT RECOMMENDATION ENGINE

(71) Applicant: ACTO Technologies Inc., Toronto (CA)

(72) Inventors: Parth Khanna, Toronto (CA); Kumar Karthik Erramilli, Scarborough (CA); Kapil Kalra, Mississauga (CA)

(73) Assignee: ACTO Technologies Inc., Toronto (CA)

(*) Notice: Subject to any disclaimer, the term of this patent is extended or adjusted under 35 U.S.C. 154(b) by 0 days.

(21) Appl. No.: 17/698,354

(22) Filed: Mar. 18, 2022

(65) Prior Publication Data

US 2022/0207102 A1 Jun. 30, 2022

Related U.S. Application Data

(63) Continuation of application No. 16/404,288, filed on May 6, 2019, now Pat. No. 11,301,527.

(51) Int. Cl.
*G06F 16/9535* (2019.01)
*G06F 16/903* (2019.01)
*G06F 16/9537* (2019.01)
*H04L 67/50* (2022.01)
*H04L 67/55* (2022.01)

(52) U.S. Cl.
CPC .... *G06F 16/9535* (2019.01); *G06F 16/90335* (2019.01); *G06F 16/9537* (2019.01); *H04L 67/535* (2022.05); *H04L 67/55* (2022.05)

(58) Field of Classification Search
CPC ........... G06F 16/9537; G06F 16/90335; G06F 16/9535; H04L 67/535; H04L 67/55
See application file for complete search history.

(56) References Cited

U.S. PATENT DOCUMENTS

| | | | |
|---|---|---|---|
| 8,271,295 B1 | 9/2012 | Miller et al. | |
| 9,195,715 B1 | 11/2015 | Ngo et al. | |
| 2002/0173990 A1 | 11/2002 | Marasco | |
| 2003/0073069 A1 | 4/2003 | Selick et al. | |
| 2003/0216937 A1 | 11/2003 | Schreiber et al. | |
| 2004/0039640 A1 | 2/2004 | Koppelman et al. | |
| 2004/0153440 A1 | 8/2004 | Halevy et al. | |
| 2011/0213625 A1* | 9/2011 | Joao | G16H 20/40 705/2 |

(Continued)

*Primary Examiner* — Etienne P Leroux
(74) *Attorney, Agent, or Firm* — Fernando & Partners, LLP

(57) ABSTRACT

In some implementations, a method is performed by a device including a non-transitory memory and one or more processors coupled with the non-transitory memory. In some implementations, the method includes obtaining, by the device, engagement data that indicates engagement of a plurality of devices with one or more content items of a plurality of content items. In some implementations, the method includes detecting, by the device, a first event associated with a first time that occurs after a current time. In some implementations, the method includes identifying, by the device, a first content item from the plurality of content items based on the engagement data. In some implementations, the first content item satisfies an engagement criterion associated with the first event. In some implementations, the method includes rendering, by the device, the first content item at a second time that occurs prior to the first time.

20 Claims, 15 Drawing Sheets

(56) References Cited

U.S. PATENT DOCUMENTS

| | | | |
|---|---|---|---|
| 2012/0016631 A1* | 1/2012 | Coradi | G01G 19/445 |
| | | | 702/173 |
| 2012/0084097 A1* | 4/2012 | Weisbart | G16H 20/10 |
| | | | 705/2 |
| 2013/0262196 A1* | 10/2013 | Scalici | G16H 70/40 |
| | | | 705/14.1 |
| 2013/0325822 A1 | 12/2013 | Sambamurthy et al. | |
| 2015/0201077 A1 | 7/2015 | Konig et al. | |
| 2015/0379037 A1 | 12/2015 | Pimprikar et al. | |
| 2016/0026964 A1 | 1/2016 | Rogers et al. | |
| 2016/0321551 A1 | 11/2016 | Priness et al. | |
| 2017/0011190 A1* | 1/2017 | Joao | G16H 20/30 |
| 2017/0220739 A1 | 8/2017 | Hammerle et al. | |
| 2018/0225680 A1 | 8/2018 | Wilson | |
| 2018/0333397 A1 | 11/2018 | Welch et al. | |
| 2018/0336500 A1* | 11/2018 | Pinho | G16H 80/00 |
| 2019/0336682 A1 | 11/2019 | Colleran et al. | |
| 2019/0373101 A1* | 12/2019 | Dotan-Cohen | H04M 1/72451 |

* cited by examiner

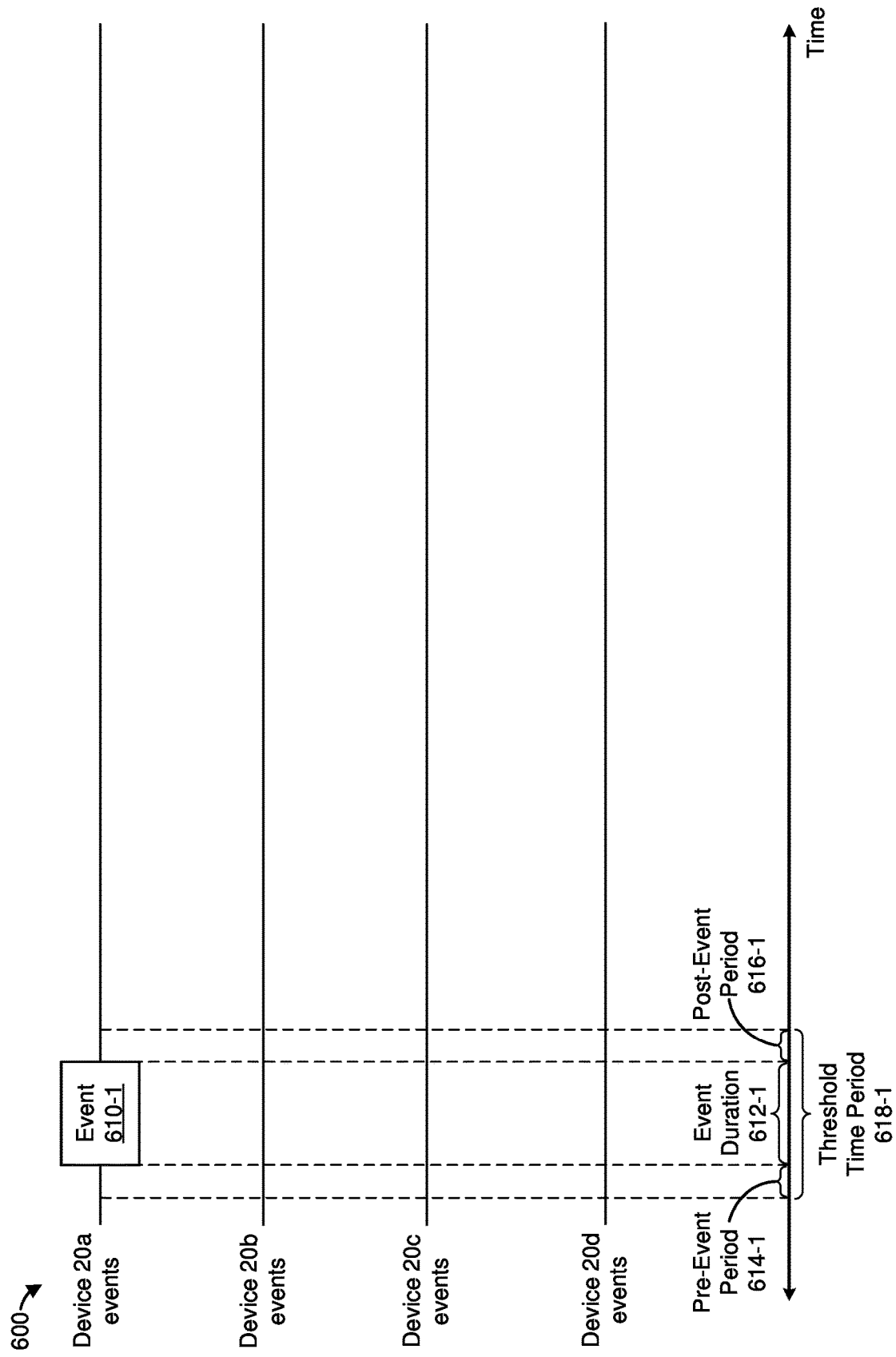

EVENT-DRIVEN CONTENT RECOMMENDATION ENGINE

CROSS-REFERENCE TO RELATED APPLICATION

This application is a continuation application of and claims priority to U.S. patent application Ser. No. 16/404,288, filed on May 6, 2019, which is hereby incorporated by reference in its entirety.

TECHNICAL FIELD

The present disclosure generally relates to recommendation engines, and in particular to an event-driven content recommendation engine.

BACKGROUND

The amount of electronic content that is available for consumption has increased exponentially over the last few years. Content creators are creating multimedia content at an increasingly fast pace, and content viewers are viewing increasingly more content. Content creators are creating different types of content items, and utilizing various distribution channels to distribute their content. For example, some content creators create short video segments and distribute the video segments through various video distribution channels such as video-sharing websites and/or video-sharing applications. Similarly, some content creators create articles and distribute the articles through article distribution channels such as online journals. Many content creators allow search engines to present their content as search results that are displayed in response to a search query. Due to the exponential increase in the amount of content that is available nowadays, users sometime struggle to find content that is relevant.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 6A-6F are diagrams illustrating event-driven content recommendation in accordance with some implementations.

Figure 1A:
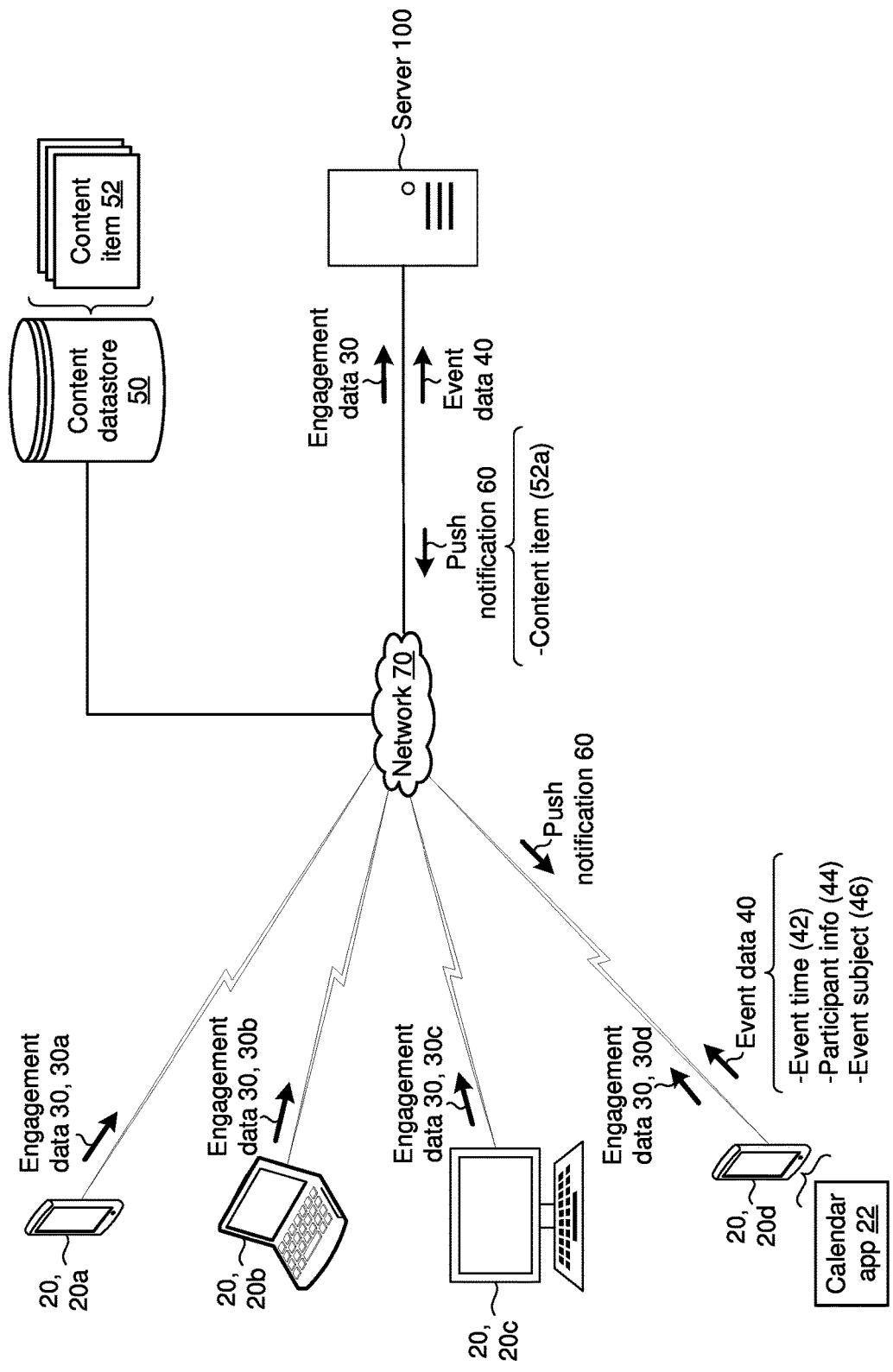
FIGS. 1A-1C are block diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for recommending relevant content for an upcoming event. In some implementations, a method is performed by a device including a non-transitory memory and one or more processors coupled with the non-transitory memory. In some implementations, the method includes obtaining, by the device, engagement data that indicates engagement of a plurality of devices with one or more content items of a plurality of content items. In some implementations, the method includes detecting, by the device, a first event associated with a first time that occurs after a current time. In some implementations, the method includes identifying, by the device, a first content item from the plurality of content items based on the engagement data. In some implementations, the first content item satisfies an engagement criterion associated with the first event. In some implementations, the method includes rendering, by the device, the first content item at a second time that occurs prior to the first time.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

The present disclosure relates to methods, devices and/or systems that provide a user with content that is relevant to an upcoming event. When a user has an upcoming event, the user's device presents content that other users engaged with shortly before, during or shortly after past events that are similar to the upcoming event. A particular content item may be relevant to an upcoming event, if other users viewed the content item, searched for the content item, and/or shared the content item shortly before, during or shortly after a past event that is similar to the upcoming event. In recommending content for an upcoming event, more weight can be assigned to content items that were viewed by other users that are considered experts, and less weight can be assigned to content items that were viewed by other users that are considered novice. In recommending content for an upcoming event, more weight can be assigned to content items that satisfy a relevance threshold associated with the upcoming event, and less weight can be assigned to content items that breach the relevance threshold associated with the upcoming event. If the upcoming event is with a healthcare provider with a known prescription bias, then content items that relate to the prescribing patterns of the healthcare provider can be assigned higher relevance scores.

FIG. 1A is a block diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes various client devices 20, a content datastore 50, a network 70, and a server 100.

In the example of FIG. 1A, the client devices 20 include a first client device 20a (e.g., a mobile electronic device such as a smartphone), a second client device 20b (e.g., a laptop or a tablet), a third client device 20c (e.g., a desktop computer), and a fourth client device 20d (e.g., a mobile electronic device). While FIG. 1A shows four client devices 20, in some implementations, the operating environment 10 may include additional client devices or fewer client devices. In some implementations, each client device 20 is associated with a particular user. For example, in some implementations, a user utilizes his/her user identifier (ID) and/or password to sign into a corresponding client device 20.

In various implementations, the content datastore 50 stores various electronic content items 52 ("content items 52", hereinafter for the sake of brevity). In various implementations, the content items 52 include various types of multimedia content. For example, in some implementations, the content items 52 include video files (e.g., movies. short video segments, and/or webinars). In some implementations, the content items 52 include audio files (e.g., audio books, podcasts, and/or instructional material). In some implementations, the content items 52 include documents (e.g., brochures, journal articles, news stories, and/or informational product literature). In various implementations, the content items 52 include computer-generated reality (CGR) content. For example, in some implementations, the content items 52 include augmented reality (AR) content, virtual reality (VR) content, and/or mixed reality (MR) content. In some implementations, the content items 52 include instructional materials. In some implementations, at least some of the content items 52 are associated with a size that is less than a threshold size.

In some implementations, the content datastore 50 includes a public datastore that is accessible to the general public over the network 70 (e.g., a portion of the Internet). For example, in some implementations, the content datastore 50 includes a video-sharing website. In some implementations, the content datastore 50 includes a private datastore (e.g., a permissioned datastore) that is accessible to client devices 20 that have been granted permission to access the content datastore 50 and not accessible to client devices 20 that have not been granted permission to access the content datastore 50. In some implementations, the content datastore 50 is controlled (e.g., owned and/or operated) by an enterprise. In such implementations, the enterprise determines which of the client devices 20 are permitted to access the content datastore 50. In some implementations, the content datastore 50 and the server 100 are controlled by different entities (e.g., the content datastore 50 is controlled by a first enterprise and the server 100 is controlled by a second enterprise). Alternatively, in some implementations, the content datastore 50 and the server 100 are controlled by a common entity (e.g., the content datastore 50 and the server 100 are controlled by the same enterprise).

In various implementations, the content items 52 in the content datastore 50 are provided (e.g., synthesized or created) by one or more content creation entities ("content creators", hereinafter for the sake of brevity). In some implementations, the content creators include product manufacturers, and the content items 52 include information product materials. In some implementations, the content creators include pharmaceutical drug manufacturers that manufacture pharmaceutical drugs, and the content items 52 include pharmaceutical drug information. For example, the content items 52 specify medicinal uses of the pharmaceutical drugs that have been approved by an administrative body such as the United States Food and Drug Administration (FDA). In some implementations, the content items 52 specify dosage information (e.g., approved dosages and/or recommended dosages) for the pharmaceutical drugs. In some implementations, the content items 52 specify drug delivery mechanisms for the pharmaceutical drugs (e.g., the content items 52 specify whether a pharmaceutical drug is to be administered orally, via intravenous infusion, and/or via an ointment.

In some implementations, a content item 52 related to a particular pharmaceutical drug provides a comparison of that particular pharmaceutical drug with other comparable pharmaceutical drugs manufactured by other pharmaceutical drug manufacturers. For example, in some implementations, the content item 52 includes a journal article that describes advantages of that particular pharmaceutical drug over the other comparable pharmaceutical drugs. In some implementations, the content item 52 includes prescribing patterns for the pharmaceutical drug. For example, the content item 52 indicates a number of physicians or a percentage of physicians that are prescribing the pharmaceutical drug in a geographical region.

In some implementations, the content creators include medical device companies that manufacture medical devices, and the content items 52 include medical device information. In some implementations, the medical devices include healthcare provider devices that are utilized by healthcare providers to provide patient care. For example, the medical devices include surgical equipment that is utilized in performing surgical operations. In some implementations, the medical devices include patient devices that are utilized by patients (e.g., insulin pumps, blood glucose monitors, etc.). In some implementations, the medical devices include patient devices that are installed inside patients (e.g., continuous glucose monitors, pace makers, and/or artificial joints such as artificial hips/knees).

In some implementations, a content item 52 related to a particular medical device provides information on using the medical device. For example, in some implementations, a content item 52 related to a medical device describes medical uses that have been approved by an administrative body (e.g., the FDA). In some implementations, a content item 52 related to a particular medical device includes a journal article regarding the medical device. In some implementations, a content item 52 related to a particular medical device compares the medical device with other comparable medical devices manufactured by other medical device manufacturers. In some implementations, a content item 52 related to a healthcare provider device indicates a number of healthcare providers or a percentage of healthcare providers that are using/recommending/prescribing that particular healthcare provider device in a geographical region.

Pharmaceutical drugs and medical devices sometimes undergo an extensive approval process that is administered by an administrative body such as the FDA. The administrative body sometimes issues a label that lists approved uses of the pharmaceutical drug or medical device. The label issued by the administrative body sometimes includes additional information such as approved dosages. In some implementations, the content items 52 include information that is included in the label issued by the administrative body. In some implementations, the content items 52 include information in addition to the label. For example, in some implementations, the content items 52 include multimedia content that explains certain aspects of the label.

In some implementations, the client devices 20 are utilized by pharmaceutical drug representatives and/or by medical device representatives (collectively referred to as "medical representatives", hereinafter for the sake of brevity). When a medical representative visits a healthcare provider to discuss a particular pharmaceutical drug or a particular medical device, the medical representative can utilize the content items 52 related to that particular pharmaceutical drug or medical device to explain various aspects of the pharmaceutical drug or medical device to the healthcare provider. Since the content items 52 related to that particular pharmaceutical drug or medical device include information from the label issued by the administrative body for that particular pharmaceutical drug or medical device, the content items 52 improve the likelihood that the healthcare provider will receive accurate information regarding the pharmaceutical drug or medical device. In some implementations, the content items 52 improve the likelihood that the information conveyed by the medical representatives to healthcare providers is consistent with the labels issued by the administrative body. Conveying information that is consistent with the labels issued by the administrative body is sometimes referred to as staying on-label. Staying on-label helps ensure that the healthcare providers have accurate information and prescribe treatments to patients in accordance with the labels thereby improving patient outcomes. In some implementations, staying on-label reduces the likelihood of off-label usages thereby preventing potential harm to patients and improving patient outcomes.

In various implementations, the server 100 obtains engagement data 30 that indicates engagement of the client devices 20 with the content items 52 stored in the content datastore 50. In the example of FIG. 1A, the server 100 obtains first engagement data 30a indicating engagement of the first client device 20a with the content items 52, second engagement data 30b indicating engagement of the second client device 20b with the content items 52, third engagement data 30c indicating engagement of the third client device 20c with the content items 52, and fourth engagement data 30d indicating engagement of the fourth client device 20d with the content items 52.

In some implementations, engaging with a content item 52 includes accessing the content item 52. In some implementations, engaging with a content item 52 includes retrieving/viewing the content item 52. In some implementations, engaging with a content item 52 includes sharing the content item 52 (e.g., forwarding the content item 52, for example, via email, instant messaging, and/or an application program). In some implementations, engaging with a content item 52 includes performing a search that yields a set of search results that include the content item 52. In some implementations, engaging with a content item 52 includes providing a user input with respect to the content item 52 (e.g., answering a quiz related to the content item 52).

In some implementations, the engagement data 30 indicates engagement of the client devices 20 with the content items 52 within a threshold time period associated with events corresponding to the client devices 20. For example, the first engagement data 30a indicates the engagement of the first client device 20a with the content items 52 within a threshold time period associated with an event (e.g., each event) corresponding to the first client device 20a. Similarly, the second engagement data 30b indicates the engagement of the second client device 20b with the content items 52 within threshold time periods associated with events corresponding to the second client device 20b.

In some implementations, the threshold time period associated with an event includes a duration of the event. In such implementations, the engagement data 30 indicates engagement of the client devices 20 with the content items 52 during events corresponding to the client devices 20. For example, the first engagement data 30a indicates the engagement of the first client device 20a with the content items 52 during events corresponding to the first client device 20a. Similarly, the second engagement data 30b indicates the engagement of the second client device 20b with the content items 52 during events corresponding to the second client device 20b.

In some implementations, the threshold time period associated with an event includes a pre-event time period. In some implementations, the pre-event time period refers to an amount of time that occurs prior (e.g., immediately prior) to the event (e.g., 15 minutes prior to the event, 1 hour prior to the event, 1 day prior to the event, etc.). In such implementations, the engagement data 30 indicates engagement of the client devices 20 with the content items 52 during the pre-event time period. For example, the third engagement data 30c indicates the engagement of the third client device 20c with the content items 52 during an amount of time that occurs immediately prior to an event corresponding to the third client device 20c.

In some implementations, the threshold time period associated with an event includes a post-event time period. In some implementations, the post-event time period refers to an amount of time that occurs after (e.g., immediately after) an event (e.g., 15 minutes after the event, 1 hour after the event, 1 day after the event, etc.). In such implementations, the engagement data 30 indicates engagement of the client devices 20 with the content items 52 during the post-event time period. For example, the fourth engagement data 30d indicates the engagement of the fourth client device 20d with the content items 52 during an amount of time that occurs immediately after an event corresponding to the fourth client device 20d.

In some implementations, the pre-event time period and the post-event time period are symmetric (e.g., both the pre-event time period and the post-event time period are 15 minutes long). In some implementations, the pre-event time period and the post-event time are asymmetric (e.g., the pre-event time period is 1 hour long and the post-event time period is 15 minutes long). In some implementations, the pre-event time period is longer than the post-event time period (e.g., the pre-event time period is 1 day long and the post-event time period is 1 hour long). Alternatively, in some implementations, the pre-event time period is shorter than the post-event time period (e.g., the pre-event time period is 1 hour long and the post-event time period is 1 day long).

In various implementations, the threshold time period includes the duration of the event, the pre-event time period and the post-event time period. In such implementations, the engagement data 30 indicates engagement of the client devices 20 with the content items 52 during corresponding events, during an amount of time that occurs immediately prior to the corresponding events, and during an amount of time that occurs immediately after the corresponding events. For example, in such implementations, the first engagement data 30a indicates engagement of the first client device 20a with the content items 52 during an event corresponding to the first client device 20a, during an amount of time that occurs immediately prior to the event corresponding to the first client device 20a, and during an amount of time that occurs immediately after the event corresponding to the first client device 20a.

As shown in FIG. 1A, in some implementations, the server 100 receives the engagement data 30 from the client devices 20. Alternatively or additionally, in some implementations, the server 100 obtains the engagement data 30 by monitoring the engagement of the client devices 20 with the content items 52. For example, in some implementations, the client devices 20 request the content items 52 from the server 100, and the server 100 provides the content items 52 to the client devices 20. In such implementations, the server 100 records the engagement of the client devices 20 with the content items 52. Alternatively or additionally, in some implementations, the server 100 fetches an access record from the content datastore 50. In such implementations, the access record indicates which client devices 20 accessed which content items 52. In some implementations, the server 100 obtains the engagement data 30 periodically (e.g., once every 24 hours, etc.). Alternatively or additionally, the server 100 obtains the engagement data 30 in response to a new engagement. For example, the server 100 obtains the first engagement data 30a when there is a new engagement between the first client device 20a and one of the content items 52.

As illustrated in FIG. 1A, in some implementations, the server 100 obtains event data 40 indicative of an upcoming event corresponding to a particular client device 20. In the example of FIG. 1A, the server 100 receives the event data 40 from the fourth client device 20d. The event data 40 includes an event time 42, participant information 44, and an event subject 46 (e.g., an event topic, for example, the name of a pharmaceutical drug or a medical device). In some implementations, the event data 40 includes lesser or additional information. In various implementations, the event time 42 occurs after a current time. In some implementations, the event time 42 indicates a duration of the upcoming event.

In some implementations, the participant information 44 indicates persons that are expected to participate in the upcoming event. In some implementations, the participant information 44 includes names of the persons that are expected to attend the upcoming event. For example, if the upcoming event includes a meeting with a particular physician, then the participant information 44 includes a name of the physician. In some implementations, the participant information 44 indicates a type of person that is expected to attend the upcoming event. For example, if the upcoming event includes a meeting with a specialist, then the participant information 44 indicates the specialty of the person. For example, if the upcoming event includes a meeting with an endocrinologist, then the participant information 44 indicates that the upcoming event is a meeting with an endocrinologist. Similarly, if the upcoming event includes a meeting with a cardiothoracic surgeon, then the participant information 44 indicates that the upcoming event is a meeting with a cardiothoracic surgeon.

In various implementations, the server 100 obtains the event data 40 from a calendar application. In some implementations, the event data 40 is stored in a calendar application 22 of the fourth client device 20d. In some implementations, the server 100 obtains the event data 40 from the fourth client device 20d after the event data 40 is added to the calendar application 22. For example, the server 100 receives the event data 40 in response to the event data 40 being stored in the calendar application 22. In some implementations, the server 100 receives the event data 40 from another source, for example, from a remote data source that stores event information (e.g., as described in relation to FIG. 2).

In various implementations, the server 100 recommends one or more of the content items 52 to the fourth client device 20d that are relevant to the upcoming event specified by the event data 40. In the example of FIG. 1A, the server 100 transmits a push notification 60 to the fourth client device 20d. The push notification 60 includes a first content item 52a that the server 100 selected from the content items 52 stored in the content datastore 50. In the example of FIG. 1A, the server 100 sends the first content item 52a or a link to the first content item 52a to the fourth client device 20d because the server 100 has determined that the first content item 52a is relevant to the upcoming event specified by the event data 40.

In various implementations, the server 100 identifies the first content item 52a based on the engagement data 30 indicating the engagement of the client devices 20 with the content items 52. In some implementations, the server 100 identifies a subset of the content items 52 that the client devices 20 engaged with during a threshold time period associated with past events that are similar to the upcoming event. For example, in some implementations, the server 100 identifies a subset of the content items 52 that the client devices 20 engaged with during past events that are similar to the upcoming event. Additionally or alternatively, in some implementations, the subset of the content items 52 includes content items 52 that the client devices 20 engaged with during an amount of time that occurred immediately prior to past events that are similar to the upcoming event. Additionally or alternatively, in some implementations, the subset of the content items 52 includes content items 52 that the client devices 20 engaged with during an amount of time that occurred immediately after the past events that are similar to the upcoming event. In some implementations, the server 100 generates a relevance score for each content item 52 in the subset, and selects a number of content items 52 from the subset based on the relevance scores (e.g., the server 100 selects the content item(s) 52 with the highest relevance score).

In some implementations, the server 100 generates the relevance scores for the content items 52 based on a degree of similarity between the upcoming event and the past event(s) during/before/after which the content items 52 were engaged with. In some implementations, the server 100 generates similarity scores for past events based on similarities between the participant information 44 of the upcoming event and participant information for the past events. For example, a past event with the same type of specialist as the upcoming event is assigned a higher similarity score than another past event with a different type of specialist. As an example, if the upcoming event is with an endocrinologist, then a past event with an endocrinologist is assigned a higher similarity score than another past event with a rheumatologist. Additionally or alternatively, in some implementations, the server 100 generates the similarity scores for the past events based on similarities between the event subject 46 of the upcoming event and event subjects of the past events. For example, a past event regarding the same pharmaceutical drug or the same medical device as the upcoming event is assigned a higher similarity score than another past event regarding another pharmaceutical drug or another medical device. In various implementations, the relevance scores of the content items 52 are a function of (e.g., proportional to, for example, directly proportional to) the similarity scores of the past events during which the content items 52 were engaged with.

As described herein, in various implementations, the server 100 recommends one or more of the content items 52 to the fourth client device 20d based on the engagement of the client devices 20 with the content items 52 during/before/after past events that are similar to the upcoming event. In some implementations, this approach tends to identify content items 52 that other client devices 20 engaged with during/before/after past events that are within a degree of similarity to the upcoming events. In some implementations, this approach tends to improve the relevance of the recommended content item(s) 52 to the upcoming event. Being able to recommend content items 52 that are more relevant to the upcoming event improves an operability of the client devices 20, the network 70 and/or the server 100. For example, providing content items that are more relevant to the upcoming event reduces the likelihood of unnecessary requests from the client devices 20. Reducing unnecessary content requests tends to improve battery life of the client devices 20 that are battery powered thereby improving the operability of the client devices 20. Reducing unnecessary content requests tends to reduce unnecessary network traffic thereby improving the operability of the network 70 by reducing the likelihood of network congestion. Reducing unnecessary content requests tends to reduce usage of valuable server resources thereby improving the operability of the server 100 by reducing the likelihood of server overload and/or server crashes.

Additionally, recommending content that is more relevant to an upcoming event provides an enhanced user experience. For example, recommending content that is relevant to an upcoming event reduces the needs for a medical representative to search for relevant content prior to the upcoming event. Recommending content that is relevant to an upcoming event tends to reduce off-label messaging. For example, presenting relevant content to a medical representative prior to an upcoming event improves the likelihood of the medical representative sharing (e.g., presenting or forwarding) on-label information with the healthcare provider and not off-label information thereby allowing the healthcare provider to generate more accurate treatment plans and/or improving patient outcomes. Recommending content that is relevant to an upcoming event tends to increase the likelihood of the medical representative sharing more relevant information with the healthcare provider, and the healthcare provider recommending/prescribing the pharmaceutical drug or medical device to patients thereby increasing credits received by a pharmaceutical drug manufacturer or a medical device manufacturer that manufacturing the pharmaceutical drug or medical device.

In various implementations, the server 100 transmits the push notification 60 to the fourth client device 20d prior to the upcoming event (e.g., prior to the event time 42 specified in event data 40). In some implementations, the server 100 transmits the push notification 60 to the fourth client device 20d at a second time that occurs a predefined amount of time before the event time 42 (e.g., the server 100 transmits the push notification 60 to the fourth client device 20d 24 hours before the event time 42, 1 hour before the event time 42, 15 minutes before the event time 42, etc.).

In some implementations, the server 100 transmits multiple push notifications to the fourth client device 20a at different times prior to the event time 42. For example, in some implementations, the server 100 transmits a first push notification at a first amount of time prior to the event time 42 (e.g., 24 hours prior to the event time 42), and a second push notification at a second amount of time prior of the event time 42 (e.g., 1 hour prior to the event time 42). In some such implementations, the first push notification and the second push notification recommend the same content item (e.g., the first content item 52a shown in FIG. 1A). Alternatively, in some implementations, the first push notification and the second push notification recommend different content items.

In some implementations, the first push notification recommends the first content item 52a, and the second push notification recommends an abridged version of the first content item 52a (e.g., a human-curated summary of the first content item 52a, and/or a computer-generated summary of the first content item 52a). In some implementations, the first push notification recommends the first content item 52a, and the second push notification recommends a second content item that is shorter than and/or less complex than the first content item. Since the second push notification is sent closer to the upcoming event, recommending a shorter and/or less complex content item via the second push notification increases the likelihood that the user of the fourth client device 20d will have sufficient time to review the recommended content item thereby providing an enhanced user experience.

In some implementations, the server 100 generates complexity scores for the content items 52. In some implementations, the complexity scores indicate a complexity level of the corresponding content items 52. In some implementations, the complexity score for a content item 52 is based on a size of the content item 52 (e.g., a number of pages in a document, a length of a video/audio file, and/or a file size of the content item 52). In some implementations, the complexity score for a content item 52 is based on a number of concepts referenced in the content item 52. In implementations where the server 100 sends multiple push notifications for an upcoming event, an earlier push notification (e.g., a first push notification sent 24 hours prior to the event time 42) recommends a content item 52 with a first complexity score, and a later push notification (e.g., a second push notification sent 1 hour prior to the event time 42) recommends another content item with a second complexity score that is lower than the first complexity score.

Figure 1B:
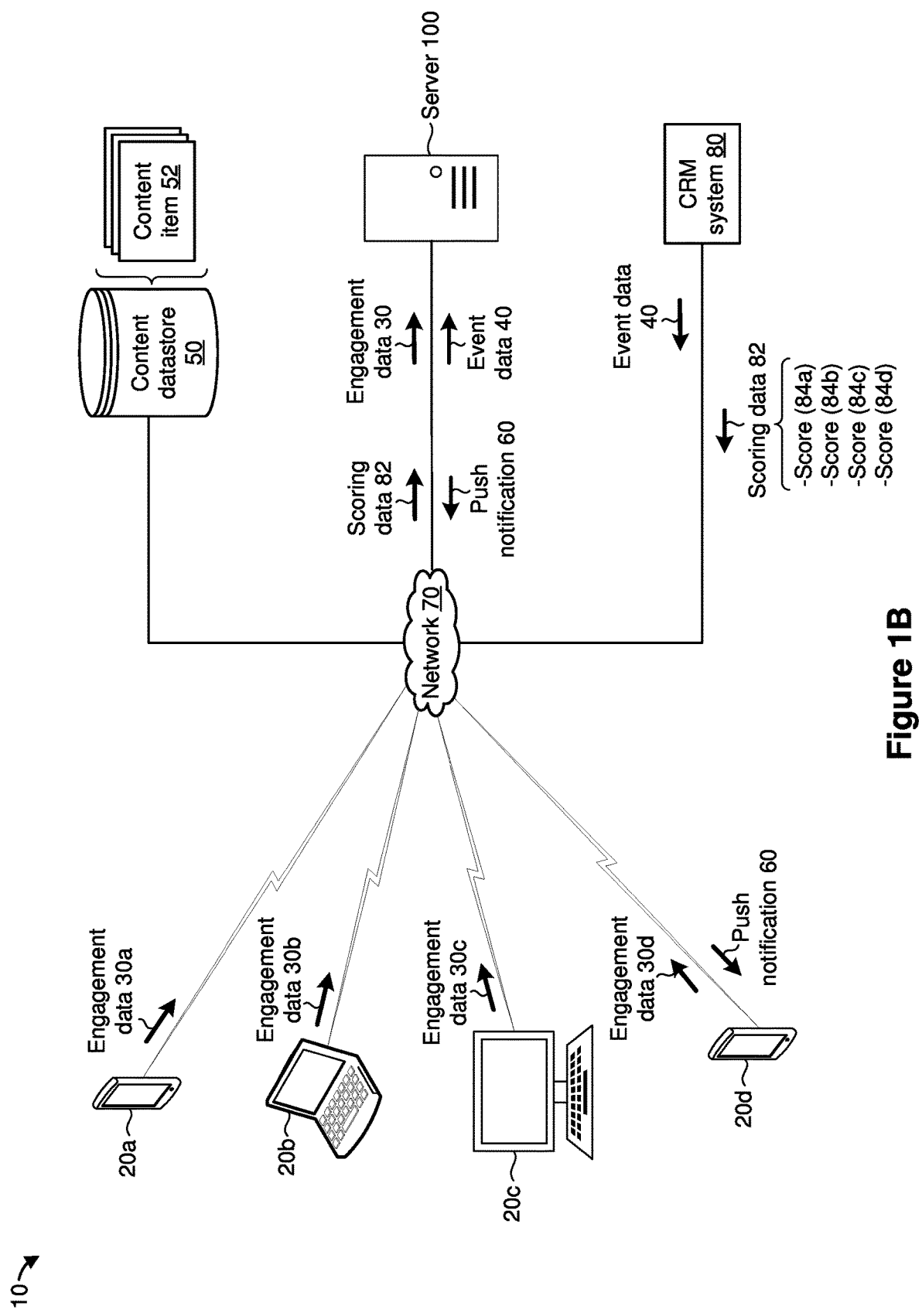

Referring to FIG. 1B, in some implementations, the operating environment 10 includes a client relationship management (CRM) system 80. In some implementations, the CRM system 80 is referred to as a remote data source. In some implementations, the CRM system 80 includes a datastore (not shown) that stores information regarding future events. For example, in some implementations, users of the client devices 20 input information regarding future events into the CRM system 80. For example, a user of the fourth client device 20d (e.g., a medical representative utilizing the fourth client device 20d) inputs the event data 40 regarding the upcoming event into the CRM system 80. In some such implementations, the server 100 obtains the event data 40 from the CRM system 80. In some implementations, the server 100 accesses the CRM system 80 and retrieves the event data 40 from the CRM system 80. For example, the server 100 utilizes an application programming interface (API) provided by an operator of the CRM system 80 to obtain the event data 40 (e.g., a RESTful API that utilizes HTTP requests such as GET, PUT, POST and DELETE). In some implementations, the server 100 receives the event data 40 from the CRM system 80 (e.g., the CRM system 80 pushes the event data 40 to the server 100).

In some implementations, the server 100 obtains scoring data 82 for the client devices 20 from the CRM system 80. In some implementations, the scoring data 82 indicates (e.g., includes) respective device scores for the client devices 20. In the example of FIG. 1B, the scoring data 82 indicates a first device score 84a for the first client device 20a, a second device score 84b for the second client device 20b, a third device score 84c for the third client device 20c, and a fourth device score 84d for the fourth client device 20d. Although in the example of FIG. 1B, the server 100 receives the devices scores 84a, 84b, 84c and 84b from the CRM system 80, in various implementations, the server 100 determines (e.g., computes) the devices scores 84a, 84b, 84c and 84d based on the scoring data 82 and/or the engagement data 30.

In various implementations, the scoring data 82 indicates respective skill levels of the users that are utilizing the client devices 20. In some implementations, the users of the client devices 20 are medical representatives, and the scoring data 82 indicates the medical representatives' ability to setup events with healthcare providers, and/or attend events with healthcare providers. In some implementations, the medical representatives are associated with respective geographic regions (e.g., cities, states, countries, etc.), and the scoring data 82 indicates sales of pharmaceutical drugs and/or medical devices represented by the medical representatives in their respective geographical regions. For example, the first device score 84a indicates a first amount of sales of a pharmaceutical drug in a first geographical region in which the first client device 20a operates. Similarly, the second device score 84b indicates a second amount of sales of the pharmaceutical drug in a second geographical region in which the second client device 20b operates.

In some implementations, the users of the client devices 20 are medical representatives, and the scoring data 82 indicates respective sales data for the medical representatives. For example, the scoring data 82 indicates which medical representatives satisfied their sales quotas and/or which medical representative did not satisfy their sales quota. In some implementations, the devices scores have a binary value indicating whether or not respective medical representatives satisfied their sales quota. For example, in some implementations, the first device score 84a has a binary value of '1' indicating that a first medical representative using the first client device 20a satisfied his/her sales quota. In some implementations, the second device score 84b has a binary value of '0' indicating that a second medical representative using the second client device 20b did not satisfy his/her sales quota. In some implementations, the devices scores indicate an amount by which the medical representatives exceeded or fell short of their sales quota. For example, in some implementations, the third device score 84c has a value of '1.50' indicating that a third medical representative using the third client device 20c exceeded his/her sales quota by 50%. In some implementations, the fourth device score 84d has a value of '0.80' indicating that a fourth medical representative using the fourth client device 20d satisfied 80% of his/her sales quota or fell short by 20%.

In various implementations, the server 100 utilizes the scoring data 82 (e.g., the devices scores 84a, 84b, 84c and/or 84d) to identify content items 52 that may be relevant to the upcoming event indicated by the event data 40. In some implementations, the server 100 generates respective relevance scores for the content items 52 based on the devices scores 84a . . . 84d of the client devices 20 that engaged with the content items 52. In some implementations, the relevance scores of the content items 52 are proportional to the devices scores of the client devices 20 that engaged with the content items 52. For example, content items 52 that are engaged by client devices 20 with relatively higher devices scores are assigned a higher relevance score, and content items 52 that are engaged by client devices 20 with relatively lower device scores are assigned a lower relevance score.

In some implementations, the server 100 gives different weights to the engagement data 30 based on the scoring data 82. For example, in some implementations, the server 100 assigns less weight to the engagement data 30 of certain client devices 20 if their corresponding device score is less than a threshold score. As an example, if the first device score 84a is less than a threshold score, then the server 100 discards the first engagement data 30a of the first client device 20a. Discarding the engagement data 30 of client devices 20 with relatively low device scores reduces the likelihood of selecting content items with low relevance to the upcoming event thereby improving the effectiveness of the server 100 and/or providing a better user experience.

In some implementations, the server 100 assigns more weight to engagement data 30 of certain client devices 20 if their corresponding device score is greater than (e.g., much greater than) a threshold score. As an example, if the second device score 84b is greater than (e.g., much greater than, for example, at least 50% higher than the threshold score) the threshold score, then the server 100 gives more weight to the second engagement data 30b of the second client device 20b. Assigning more weight to the engagement data 30 of client devices 20 with relatively high device scores increases the likelihood of selecting content items with high relevance to the upcoming event thereby improving the effectiveness of the server 100 and/or providing a better user experience.

Figure 1C:
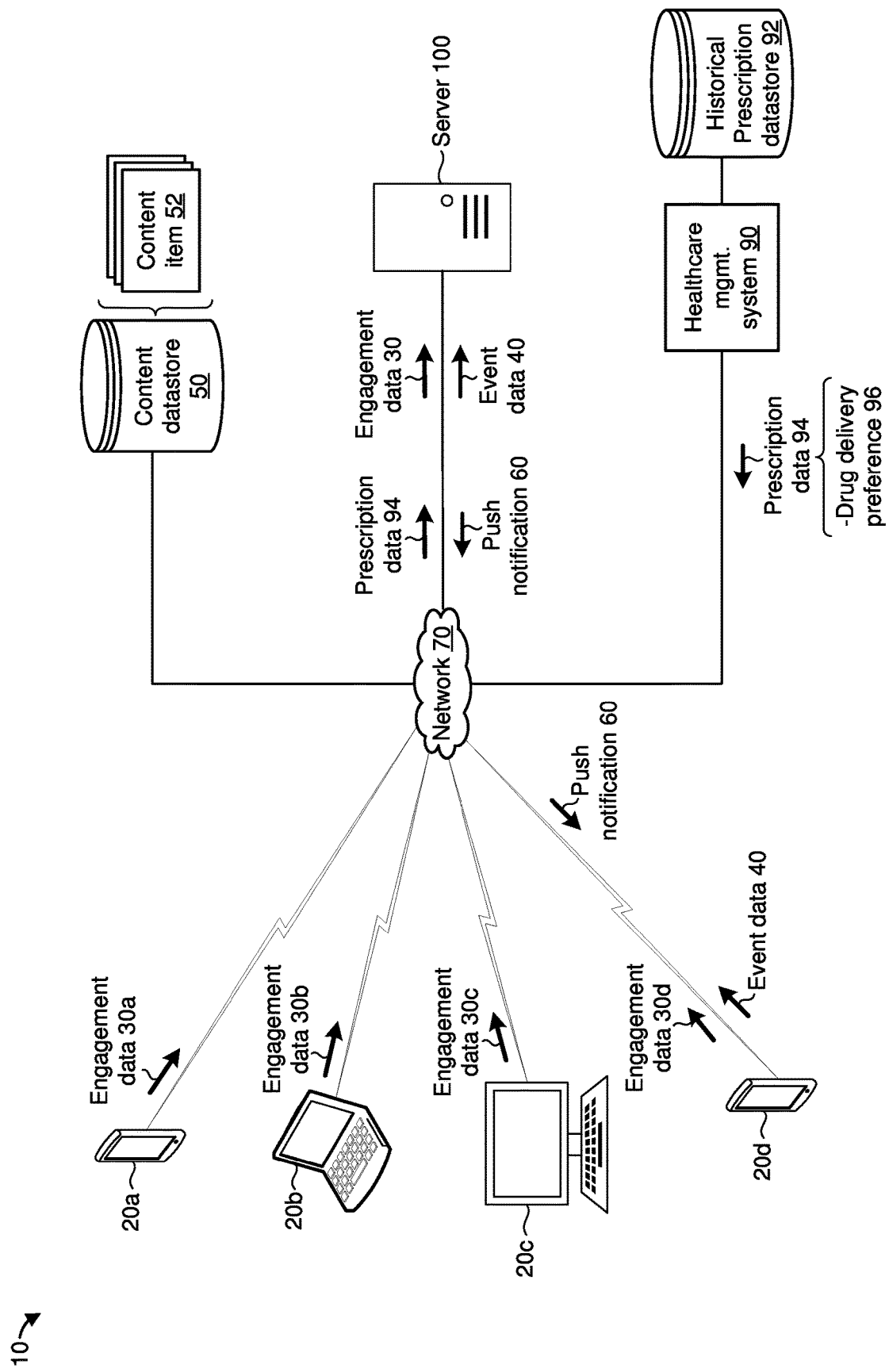

Referring to FIG. 1C, in some implementations, the operating environment 10 includes a healthcare management system 90 that stores information regarding various healthcare providers (e.g., physicians, nurses, etc.) and/or patients. In some implementations, the healthcare management system 90 includes a healthcare prescription datastore 92 that stores historical prescription data 94 ("prescription data 94", hereinafter for the sake of brevity) for prescriptions issued by healthcare providers. In some implementations, the prescription data 94 includes names of pharmaceutical drugs, dosage amounts, and drug delivery indicia (e.g., whether the healthcare provider prescribed an oral medication, an injection and/or an ointment). As illustrated in FIG. 1C, in various implementations, the server 100 obtains the prescription data 94 for various healthcare providers from the healthcare management system 90. In some implementations, the server 100 obtains drug delivery preferences 96 of various healthcare providers from the healthcare management system 90. In some implementations, the drug delivery preference 96 of a healthcare provider indicates a drug delivery method that the healthcare provider is biased towards (e.g., tends to prefer). For example, in some implementations, the drug delivery preference 96 of a healthcare provider indicates a drug delivery method that the healthcare provider prescribed in more than a threshold amount of prescriptions stored in the historical prescription datastore

92. For example, the drug delivery preference 96 of a healthcare provider indicates that the healthcare provider is biased towards prescribing the ointment version of a particular drug over the tablet version of that particular drug, if the healthcare provider prescribed the ointment version in more than a threshold percentage of prescriptions related to that particular drug.

In various implementations, the server 100 selects the relevant content item(s) 52 for the upcoming event based on the prescription data 94. In some implementations, the server 100 generates relevance scores for the content items 52 based on the prescription data 94. In some implementations, the server 100 generates relevance scores for the content items 52 based on the drug delivery preference 96. In some implementations, content items 52 that relate to the drug delivery preference 96 are assigned a higher relevance score than content items 52 that are not related to the drug delivery preference 96. More generally, in various implementations, the relevance scores of the content items 52 are a function of the drug delivery preference 96. Recommending one or more of the content items 52 based on the prescription data 94 (e.g., the drug delivery preference 96) tends to provide content recommendations that are more relevant to the upcoming event thereby improving the operability of the client devices 20, the network 70 and/or the server 100, and/or providing an enhanced user experience.

Figure 2A:
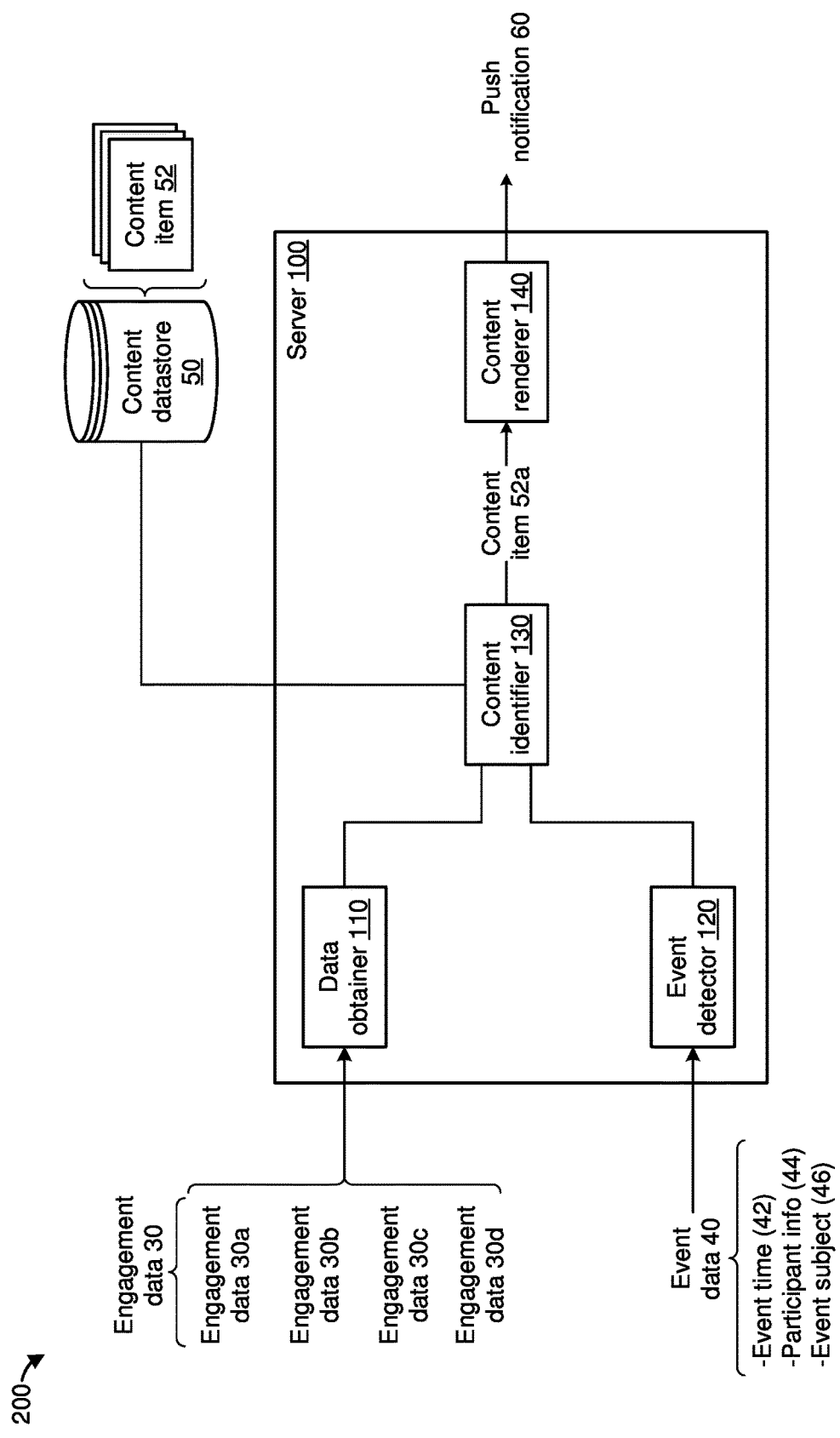
FIGS. 2A-2C are block diagrams of an example server in accordance with some implementations.

FIG. 2A illustrates an example block diagram 200 for the server 100. As illustrated in FIG. 2A, in some implementations, the server 100 includes a data obtainer 110, an event detector 120, a content identifier 130, and a content renderer 140. In various implementations, the data obtainer 110 obtains the engagement data 30. For example, in some implementations, the data obtainer 110 receives the first engagement data 30a from the first client device 20a, the second engagement data 30b from the second client device 20b, the third engagement data 30c from the third client device 20c, and the fourth engagement data 30d from the fourth client device 20d. In some implementations, the data obtainer 110 monitors the engagement of the client devices 20 with the content items 52, and generates the engagement data 30 based on the monitoring.

In various implementations, the event detector 120 detects upcoming events. For example, in some implementations, the event detector 120 detects upcoming events associated with the client devices 20. In some implementations, the event detector 120 detects the upcoming events by obtaining the event data 40. In some implementations, the event detector 120 receives the event data 40 from one or more of the client devices 20 (e.g., from the fourth client device 20d as shown in FIG. 1A). In some implementations, the event detector 120 receives the event data 40 from a remote data source (e.g., from the CRM system 80 shown in FIG. 1B).

In various implementations, the content identifier 130 identifies one or more of the content items 52 that are relevant to the upcoming event indicated by the event data 40. In various implementations, the content identifier 130 recommends one or more of the content items 52 for the upcoming event based on the engagement of the client devices 20 with the content items 52 during/before/after past events that are similar to the upcoming event. In various implementations, the content identifier 130 generates respective relevance scores for the content items 52 based on the engagement data 30 and/or the event data 40. In such implementations, the content identifier 130 recommends one or more of the content items 52 based on the relevance scores of the content items 52. For example, in some implementations, the content identifier 130 selects a threshold number of content items 52 that are associated with the highest relevance scores (e.g., the content identifier 130 selects the content item 52 with the highest relevance score). In the example of FIG. 2A, the content identifier 130 selects the first content item 52a from the content datastore 50, for example, because the first content item 52a has the highest relevance score. In some implementations, the content identifier 130 indicates the selected content item(s) to the content renderer 140. For example, the content identifier 130 sends the first content item 52a to the content renderer 140.

In some implementations, the content identifier 130 generates the relevance scores for the content items 52 based on a degree of similarity between the upcoming event and the past event(s) during/before/after which the content items 52 were engaged with. In some implementations, the content identifier 130 generates similarity scores for past events based on similarities between the participant information 44 of the upcoming event and participant information for the past events. Additionally or alternatively, in some implementations, the content identifier 130 generates the similarity scores for the past events based on similarities between the event subject 46 of the upcoming event and event subjects of the past events. In various implementations, the content identifier 130 generates the relevance scores for the content items 52 based on the similarity scores of the past events during which the content items 52 were engaged with.

As described herein, in various implementations, the content identifier 130 recommends one or more of the content items 52 based on the engagement of the client devices 20 with the content items 52 during/before/after past events that are similar to the upcoming event. In some implementations, this approach tends to identify content items 52 that other client devices 20 engaged with during/before/after past events that are within a degree of similarity to the upcoming events. In some implementations, this approach tends to improve the relevance of the recommended content item(s) 52 to the upcoming event. Being able to recommend content items 52 that are more relevant to the upcoming event improves an operability of the client devices 20, the network 70 and/or the server 100. For example, providing content items that are more relevant to the upcoming event reduces the likelihood of unnecessary requests from the client devices 20. Reducing unnecessary content requests tends to improve battery life of the client devices 20 that are battery powered thereby improving the operability of the client devices 20. Reducing unnecessary content requests tends to reduce unnecessary network traffic thereby improving the operability of the network 70 by reducing the likelihood of network congestion. Reducing unnecessary content requests tends to reduce usage of valuable server resources thereby improving the operability of the server 100 by reducing the likelihood of server overload and/or server crashes. As discussed herein, providing relevant content to medical representatives and/or healthcare providers prior to an upcoming event tends to improve patient outcomes and/or increase credits received by manufacturers of pharmaceutical drugs or medical devices.

In various implementations, the content renderer 140 renders one or more of the content items 52 selected by the content identifier 130. In some implementations, the content renderer 140 generates the push notification 60, and the push notification 60 includes the one or more content items 52 selected by the content identifier 130. In the example of FIG. 2A, the push notification 60 includes the first content item 52a selected by the content identifier 130. In some implementations, the content renderer 120 transmits the push notification to a display that is coupled to the server 100. In some implementations, the content renderer 120 transmits the push notification 60 to the client device 20 associated with the upcoming event (e.g., to the fourth client device 20*d* shown in FIG. 1A). In some implementations, the content renderer 140 transmits the push notification 60 prior to the event time 42 of the upcoming event.

In some implementations, the content renderer 140 transmits multiple push notifications at different times prior to the event time 42. For example, in some implementations, the content renderer 140 transmits a first push notification at a first amount of time prior to the event time 42 (e.g., 24 hours prior to the event time 42), and a second push notification at a second amount of time prior of the event time 42 (e.g., 1 hour prior to the event time 42). In some such implementations, the first push notification and the second push notification recommend the same content item (e.g., the first content item 52*a*). Alternatively, in some implementations, the first push notification and the second push notification recommend different content items. In some implementations, the content identifier 130 generates complexity scores for the content items 52. In such implementations, the content renderer 140 transmits an earlier push notification that recommends a first content item (e.g., the first content item 52*a*) with a first complexity score, and a later push notification that recommends a second content item 52 with a second complexity score that is lower than the first complexity score.

Figure 2B:
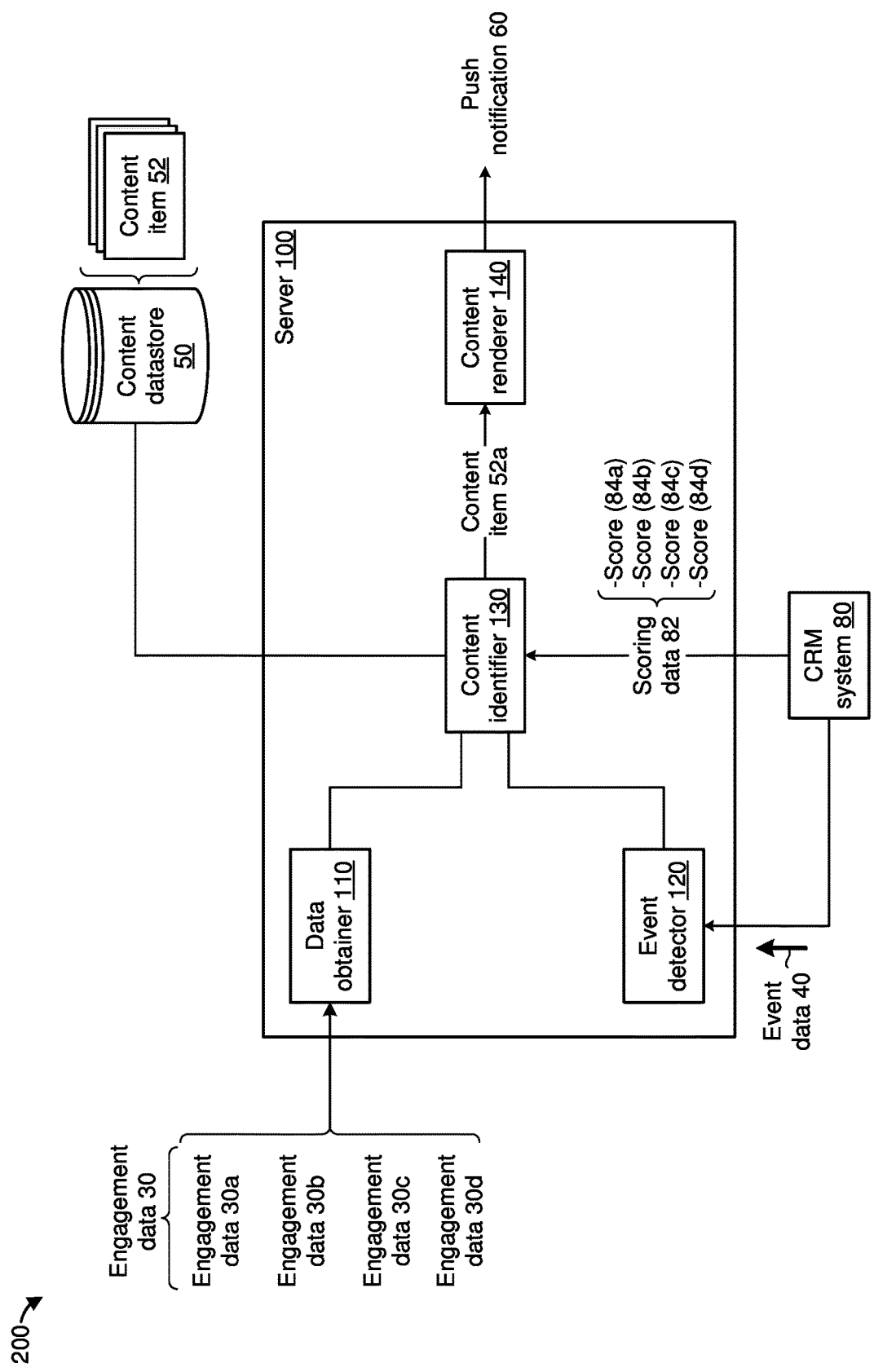

Referring to FIG. 2B, in some implementations, the event detector 120 obtains the event data 40 from the CRM system 80 (e.g., instead of obtaining the event data 40 from the client devices 20). In some implementations, the event detector 120 utilizes an API provided by an operator of the CRM system 80 to obtain the event data 40 from the CRM system 80.

In some implementations, the content identifier 120 utilizes the scoring data 82 (e.g., the device scores 84*a* . . . 84*d*) to recommend one or more of the content items 52 for the upcoming event. In some implementations, the content identifier 130 generates respective relevance scores for the content items 52 based on the devices scores 84*a* . . . 84*d* of the client devices 20 that engaged with the content items 52. In some implementations, the relevance scores of the content items 52 are proportional to the devices scores of the client devices 20 that engaged with the content items 52. For example, content items 52 that are engaged by client devices 20 with relatively higher devices scores are assigned a higher relevance score, and content items 52 that are engaged by client devices 20 with relatively lower device scores are assigned a lower relevance score.

In some implementations, the content identifier 130 assigns different weights to the engagement data 30 based on the scoring data 82. For example, in some implementations, the content identifier 130 assigns less weight to the engagement data 30 of certain client devices 20 if their corresponding device score is less than a threshold score. As an example, if the first device score 84*a* is less than a threshold score, then the content identifier 130 discards the first engagement data 30*a* of the first client device 20*a*. Discarding the engagement data 30 of client devices 20 with relatively low device scores reduces the likelihood of selecting content items with low relevance to the upcoming event thereby improving the effectiveness of the server 100 and/or providing a better user experience.

In some implementations, the content identifier 130 assigns more weight to engagement data 30 of certain client devices 20 if their corresponding device score is greater than (e.g., much greater than) a threshold score. As an example, if the second device score 84*b* is greater than (e.g., much greater than, for example, at least 50% higher than the threshold score) the threshold score, then the content identifier 130 assigns more weight to the second engagement data 30*b* of the second client device 20*b*. Assigning more weight to the engagement data 30 of client devices 20 with relatively high device scores increases the likelihood of selecting content items with high relevance to the upcoming event thereby improving the effectiveness of the server 100 and/or providing a better user experience.

In some implementations, the content identifier 120 generates (e.g., computes) the device scores 84*a* . . . 84*d* based on the scoring data 82. In other words. In some implementations, the content identifier 120 utilizes the scoring data 82 and/or the engagement data 30 to generate the devices score 84*a* . . . 84*d*. Alternatively, in some implementations, the scoring data 82 includes the device scores 84*a* . . . 84*d*. As such, in some implementations, the content identifier 120 receives the devices scores 84*a* . . . 84*d* from the CRM system 80.

Figure 2C:
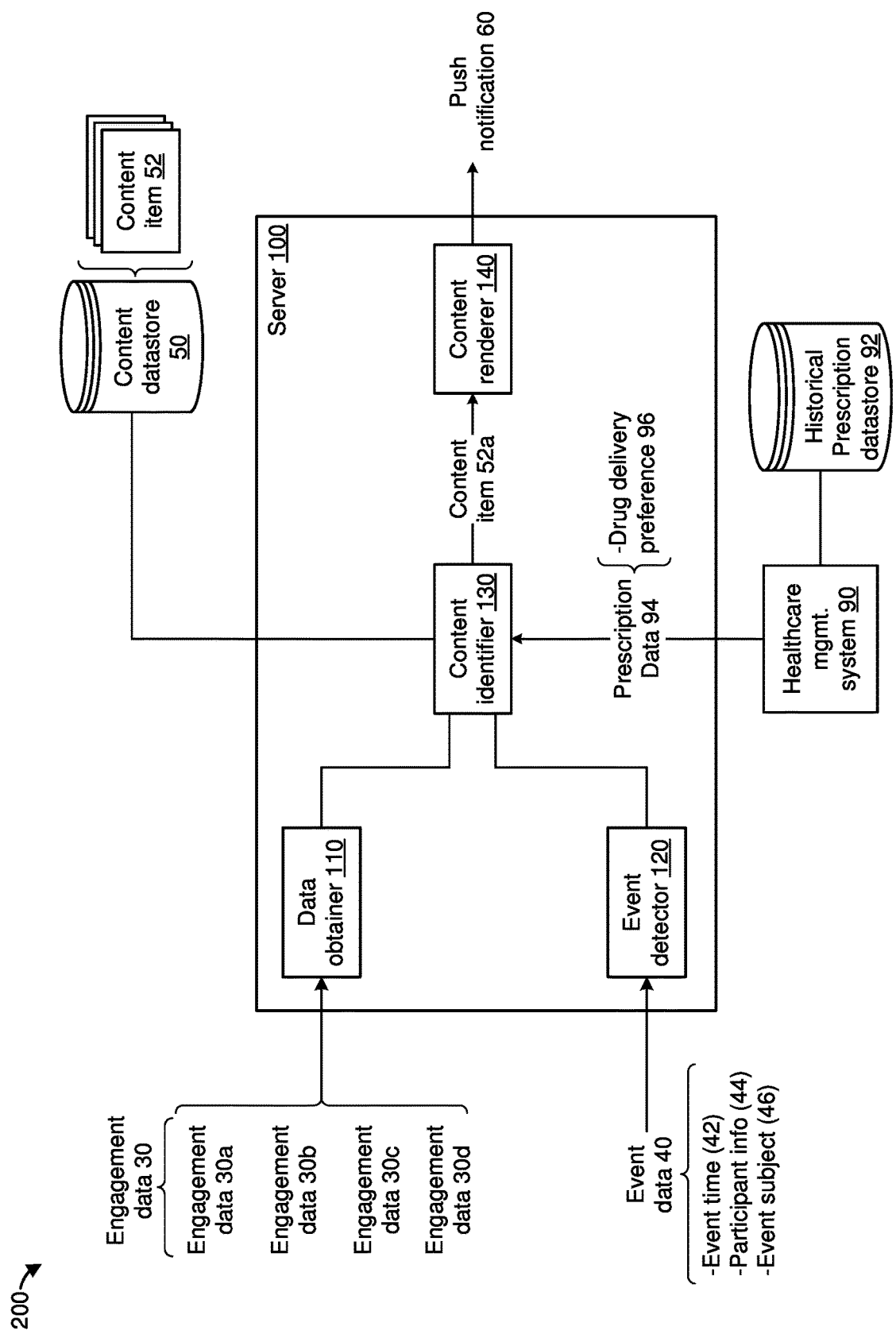

Referring to FIG. 2C, in some implementations, the content identifier 130 obtains the prescription data 94 (e.g., the drug delivery preferences 96) from the healthcare management system 90. In some implementations, the content identifier 130 recommends one or more of the content items 52 based on the prescription data 94. In some implementations, the content identifier 130 generates respective relevance scores for the content items 52 based on the prescription data 94. In some implementations, the content identifier 130 generates respective relevance scores for the content items 52 based on the drug delivery preference 96. In some implementations, content items 52 that relate to the drug delivery preference 96 are assigned a higher relevance score than content items 52 that are not related to the drug delivery preference 96. For example, if the drug delivery preference 96 of a healthcare provider attending the upcoming event includes prescribing the ointment version of a pharmaceutical drug over the tablet version of the pharmaceutical drug, then the content identifier 130 assigns higher relevance scores to content items 52 that relate to ointments and lower relevance scores to content items 52 that relate to tablets. More generally, in various implementations, the relevance scores of the content items 52 are a function of the prescription data 94 (e.g., the drug delivery preference 96). Recommending one or more of the content items 52 based on the prescription data 94 (e.g., the drug delivery preference 96) tends to provide content recommendations that are more relevant to the upcoming event thereby improving the operability of the client devices 20, the network 70 and/or the server 100, and/or providing an enhanced user experience.

Figure 3:
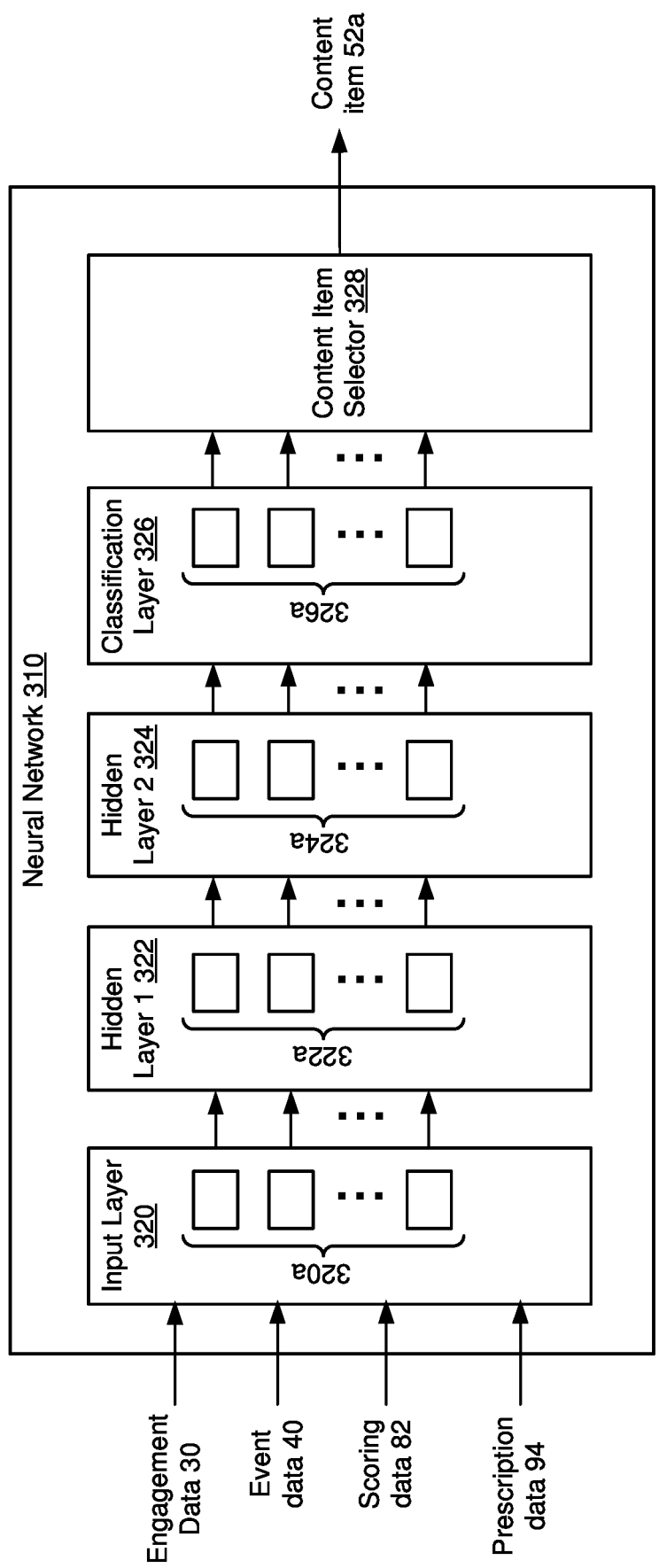
FIG. 3 is a block diagram of example neural network in accordance with some implementations.

FIG. 3 is a block diagram of a neural network 310 in accordance with some implementations. In some implementations, the neural network 310 is implemented by the server 100 shown in FIGS. 1A-2C. In other words, in some implementations, the server 100 includes the neural network 310. In some implementations, the neural network 310 is implemented by the content identifier 130 shown in FIGS. 2A-2C. In other words, in some implementations, the content identifier 130 includes the neural network 310. In the example of FIG. 3, the neural network 310 includes an input layer 320, a first hidden layer 322, a second hidden layer 324, a classification layer 326, and a content item selector 328 (e.g., a content item selection module). While the neural network 310 includes two hidden layers as an example, those of ordinary skill in the art will appreciate from the present disclosure that one or more additional hidden layers are also present in various implementations. Adding additional hidden layers adds to the computational complexity and memory demands, but may improve performance for some applications.

In various implementations, the input layer 320 is coupled (e.g., configured) to receive various inputs. In the example of FIG. 3, the input layer 320 receives inputs indicating the engagement data 30, the event data 40, the scoring data 82 (e.g., the device scores 84a . . . 84d) and/or the prescription data 94 (e.g., the drug delivery preference 96). In some implementations, the neural network 310 includes a feature extraction module (not shown) that generates a feature stream (e.g., a feature vector) based on the engagement data 30, the event data 40, the scoring data 82 and/or the prescription data 94. In such implementations, the feature extraction module provides the feature stream to the input layer 320. As such, in some implementations, the input layer 320 receives a feature stream that is a function of the engagement data 30, the event data 40, the scoring data 82 and/or the prescription data 94. In various implementations, the input layer 320 includes a number of LSTM logic units 320a, which are also referred to as model(s) of neurons by those of ordinary skill in the art. In some such implementations, an input matrix from the features to the LSTM logic units 320a include rectangular matrices. The size of this matrix is a function of the number of features included in the feature stream.

In some implementations, the first hidden layer 322 includes a number of LSTM logic units 322a. In some implementations, the number of LSTM logic units 322a ranges between approximately 10-500. Those of ordinary skill in the art will appreciate that, in such implementations, the number of LSTM logic units per layer is orders of magnitude smaller than previously known approaches (being of the order of $O(10^1)$-$O(10^2)$), which allows such implementations to be embedded in highly resource-constrained devices. As illustrated in the example of FIG. 3, the first hidden layer 322 receives its inputs from the input layer 320.

In some implementations, the second hidden layer 324 includes a number of LSTM logic units 324a. In some implementations, the number of LSTM logic units 324a is the same as or similar to the number of LSTM logic units 320a in the input layer 320 or the number of LSTM logic units 322a in the first hidden layer 322. As illustrated in the example of FIG. 3, the second hidden layer 324 receives its inputs from the first hidden layer 322. Additionally or alternatively, in some implementations, the second hidden layer 324 receives its inputs from the input layer 320.

In some implementations, the classification layer 326 includes a number of LSTM logic units 326a. In some implementations, the number of LSTM logic units 326a is the same as or similar to the number of LSTM logic units 320a in the input layer 320, the number of LSTM logic units 322a in the first hidden layer 322, or the number of LSTM logic units 324a in the second hidden layer 324. In some implementations, the classification layer 326 includes an implementation of a multinomial logistic function (e.g., a soft-max function) that produces a number of outputs that is approximately equal to the number of possible actions 360. In some implementations, each output includes a relevance score for a corresponding content item 52.

In some implementations, the content item selector 328 selects one or more of the content items 52 by selecting the top N content item candidates provided by the classification layer 326. In some implementations, the top N content item candidates are associated with the highest relevance scores. In the example of FIG. 3, the content item selector 328 selects the first content item 52a, for example, because the first content item 52a has the highest relevance score. In some implementations, the content item selector 328 provides the selected content items 52 to a rendering and display pipeline (e.g., the content renderer 140 shown in FIGS. 2A-2C).

Figure 4:
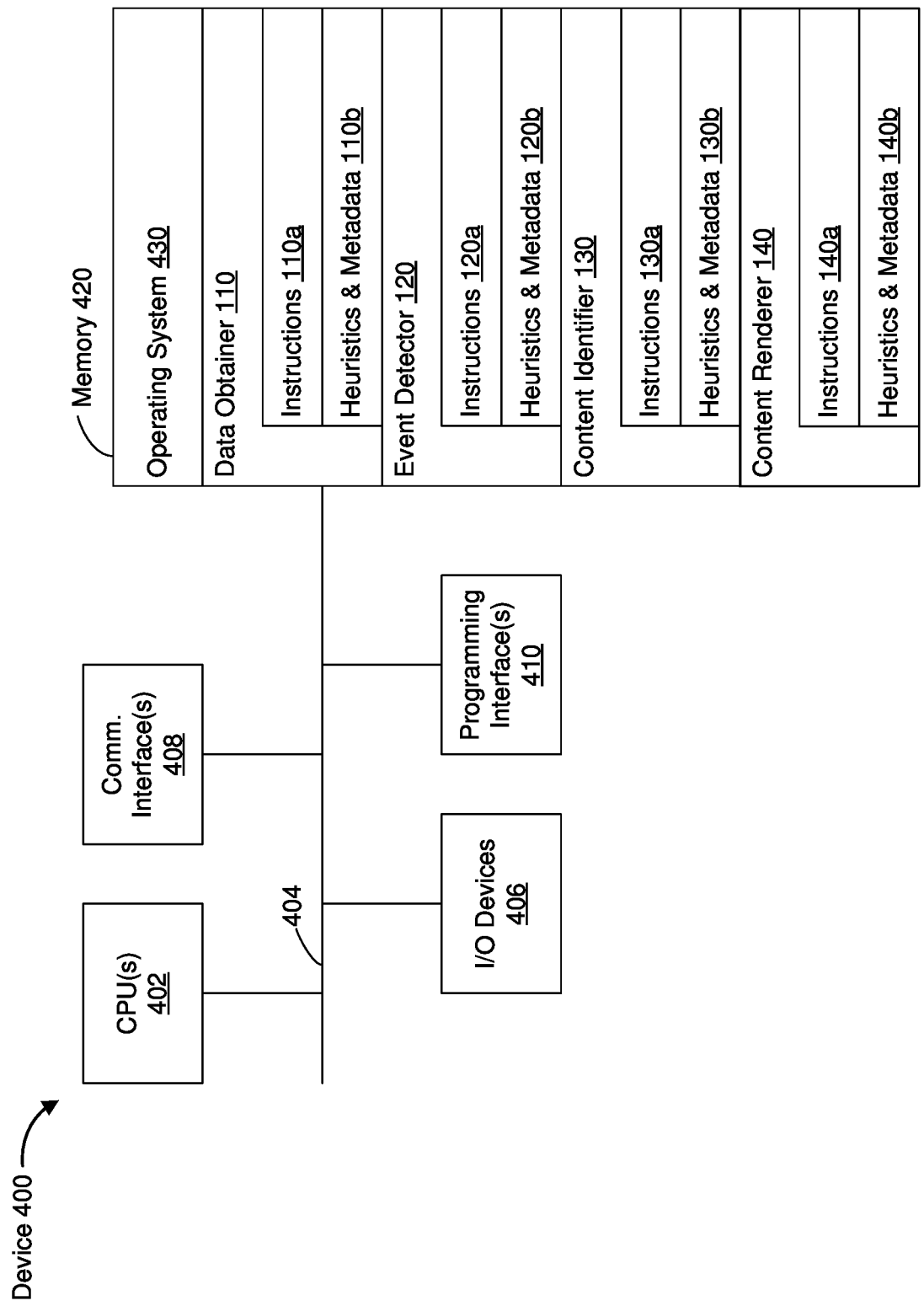
FIG. 4 is a block diagram of an example device in accordance with some implementations.

FIG. 4 is a block diagram of an example device 400 (e.g., the server 100 shown in FIGS. 1A-2C) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the device 400 includes one or more processing units 402 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 406, one or more communication interfaces 408 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), Long Term Evolution (LTE), fifth-generation cellular (5G), global positioning system (GPS), infrared (IR), BLUETOOTH, ZIGBEE, and/or the like type interface), one or more programming (e.g., I/O) interfaces 410, a memory 420, and one or more communication buses 404 for interconnecting these and various other components.

In some implementations, the one or more communication buses 404 include circuitry that interconnects and controls communications between system components. In some implementations, the one or more I/O devices 406 include at least one of a keyboard, a mouse, a touchpad, a joystick, one or more microphones, one or more speakers, one or more image sensors (e.g., one or more cameras, for example, a front-facing camera), one or more displays (e.g., one or more CGR displays), and/or the like.

The memory 420 includes high-speed random-access memory, such as dynamic random-access memory (DRAM), static random-access memory (SRAM), double-data-rate random-access memory (DDR RAM), or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof including an optional operating system 430, the data obtainer 110, the event detector 120, the content identifier 130 and the content renderer 140.

The operating system 430 includes procedures for handling various basic system services and for performing hardware dependent tasks. As described herein, in various implementations, the data obtainer 110 obtains engagement data indicating engagement of client devices with content items stored in a content datastore (e.g., the data obtainer 110 obtains the engagement data 30 shown in FIGS. 1A-2C). To that end, the data obtainer 110 includes instructions 110a, and heuristics and metadata 110b. In various implementations, the event detector 120 detects future events associated with client devices (e.g., the event detector 120 obtains the event data 40 shown in FIGS. 1A-2C). To that end, the event detector 120 includes instructions 120a, and heuristics and metadata 120b. In various implementations, the content identifier 130 recommends one or more of the content items stored in the content datastore for upcoming events (e.g., the content identifier 130 recommends the first content item 52a shown in FIGS. 1A-2C). To that end, the content identifier 130 includes instructions 130a, and heuristics and metadata 130b. In various implementations, the content rendered 140 renders the content item(s) selected by the content identifier prior to the upcoming event (e.g., the content renderer 140 transmits the push notification 60 shown in FIGS. 1A-2C). To that end, the content renderer 140 includes instructions 140a, and heuristics and metadata 140b.

Although the data obtainer 110, the event detector 120, the content identifier 130 and the content renderer 140 are shown as residing on a single device (e.g., the device 400, for example, the server 100), it should be understood that in other implementations, any combination of the data obtainer 110, the event detector 120, the content identifier 130 and the content renderer 140 may be located in separate computing devices.

Moreover, FIG. 4 is intended more as functional description of the various features which be present in a particular implementation as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 5:
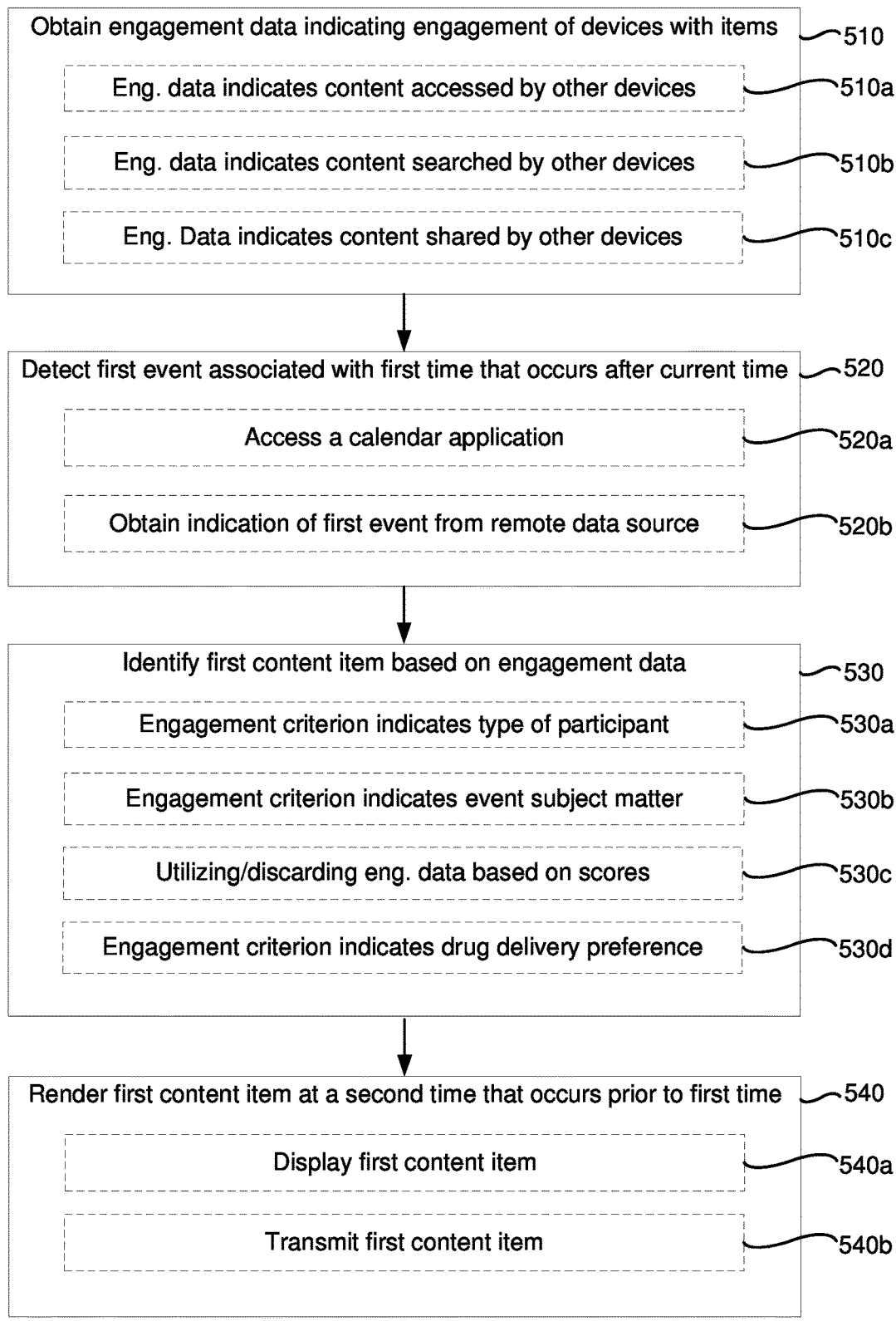
FIG. 5 is a flowchart representation of a method of recommending relevant content for an upcoming event in accordance with some implementations.

FIG. 5 is a flowchart representation of a method 500 of recommending content items that are relevant to an upcoming event. In various implementations, the method 500 is performed by a device (e.g., the server 100 shown in FIGS. 1A-2C, the neural network 310 shown in FIG. 3, and/or the device 400 shown in FIG. 4). In some implementations, the method 500 is performed by processing logic, including hardware, firmware, software, or a combination thereof. In some implementations, the method 500 is performed by a processor executing code stored in a non-transitory computer-readable medium (e.g., a memory). Briefly, in various implementations, the method 500 includes obtaining engagement data indicating engagement of client devices with various content items stored in a content datastore, detecting a first event associated with a first time that occurs after a current time, identifying a first content item from the content datastore based on the engagement data, and rendering the first content item at a second time that occurs prior to the first time.

As represented by block 510, in various implementations, the method 500 includes obtaining, by the device, engagement data that indicates engagement of a plurality of client devices with one or more content items of a plurality of content items. For example, the method 500 includes obtaining the engagement data 30 indicating engagement of the client devices 20 with the content items 52 stored in the content datastore 50. In some implementations, the method 500 includes receiving the engagement data from the client devices. In some implementations, the method 500 includes monitoring the engagement of the client devices, and determining the engagement data based on the monitoring.

As represented by block 510a, in some implementations, the engagement data indicates which content items of the plurality of content items were accessed by one or more of the plurality of devices during a threshold time period associated with past events that are similar to the first event. As described herein, in some implementations, the engagement data indicates which content items were accessed by the client devices during past events that are similar to an upcoming event. In some implementations, the engagement data indicates which content items were accessed by the client devices within a threshold amount of time prior to past events that are similar to an upcoming event (e.g., the engagement data 30 indicates which of the content items 50 were accessed by the client devices 20 within 1 hour prior to past events that are similar to the upcoming event). In some implementations, the engagement data indicates which content items were accessed by the client devices within a threshold amount of time after past events that are similar to the upcoming event (e.g., the engagement data 30 indicates which of the content items 50 were accessed by the client devices 20 within 1 hour after past events that are similar to the upcoming event).

As represented by block 510b, in some implementations, the engagement data indicates which content items of the plurality of content items match a search query received by one or more of the plurality of devices during a threshold time period associated with past events that are similar to the first event. As described herein, in some implementations, the engagement data indicates which content items match a search query received during past events that are similar to an upcoming event. In some implementations, the engagement data indicates which content items match a search query received within a threshold amount of time prior to past events that are similar to an upcoming event (e.g., the engagement data 30 indicates which of the content items 50 match a search query received within 1 hour prior to past events that are similar to the upcoming event). In some implementations, the engagement data indicates which content items match a search query received within a threshold amount of time after past events that are similar to an upcoming event (e.g., the engagement data 30 indicates which of the content items 50 match a search query received within 1 hour after past events that are similar to the upcoming event).

As represented by block 510c, in some implementations, the engagement data indicates which content items of the plurality content items were shared (e.g., forwarded, for example, via email, instant messaging or an application program) by one or more of the plurality of devices during a threshold time period associated with past events that are similar to the first event. As described herein, in some implementations, the engagement data indicates which content items were shared by the client devices during past events that are similar to the upcoming event. In some implementations, the engagement data indicates which content items were shared by the client devices within a threshold amount of time prior to past events that are similar to the upcoming event (e.g., the engagement data 30 indicates which of the content items 50 were shared within 1 hour prior to past events that are similar to the upcoming event). In some implementations, the engagement data indicates which content items were shared by the client devices within a threshold amount of time after past events that are similar to the upcoming event (e.g., the engagement data 30 indicates which of the content items 50 were shared within 1 hour after past events that are similar to the upcoming event).

As represented by block 520, in some implementations, the method 500 includes detecting, by the device, a first event associated with a first time that occurs after a current time. In some implementations, the method 500 includes receiving event data that indicates an upcoming event. For example, the method 500 includes obtaining the event data 40 shown in FIGS. 1A-2C. As represented by block 520a, in some implementations, detecting the first event includes accessing a calendar application, and retrieving event data for the first event from the calendar application (e.g., from the calendar application 22 shown in FIG. 1A). As represented by block 520b, in some implementations, detecting the first event includes obtaining an indication of the first event from a remote data source (e.g., receiving the event data 40 from the CRM system 80 shown in FIG. 1B).

As represented by block 530, in some implementations, the method 500 includes identifying, by the device, a first content item from the plurality of content items based on the engagement data. In some implementations, the first content item satisfies an engagement criterion associated with the first event. For example, the server 100 shown in FIGS. 1A-2C (e.g., the content identifier 130 shown in FIGS. 2A-2C) identifies the first content item 52a for the upcoming event indicated by the event data 40.

As represented by block 530a, in some implementations, the engagement criterion indicates a type of person attending the first event and the engagement data indicates that one or more of the plurality of devices engaged with the first content item within a threshold time period associated with a past event attended by the type of person. For example, the participant information 44 indicates that an endocrinologist will be attending an upcoming event, and at least a portion of the engagement data 30 indicates that the client devices 20 engaged with some content items 52 during, shortly before or shortly after past events attended by endocrinologists.

As represented by block 530b, in some implementations, the engagement criterion indicates a subject matter of the first event and the engagement data indicates that one or more of the plurality of devices engaged with the first content item within a threshold time period associated with a past event with the same subject matter as the first event. For example, the event subject 46 indicates a subject of the upcoming event, and at least a portion of the engagement data 30 indicates that the client devices 20 engaged with some content items 52 during, shortly before or shortly after past events that are related to the event subject 46.

As represented by block 530c, in some implementations, identifying the first content item includes obtaining respective scores associated with the plurality of devices, utilizing the engagement data of a first subset of the plurality of devices with scores that satisfy a threshold, and discarding the engagement data of a second subset of the plurality of devices with scores that breach the threshold. In some implementations, the method 500 includes obtaining the respective scores from a remote data source (e.g., from the CRM system 80 shown in FIGS. 1B and 2B). For example, the method 500 includes obtaining the devices scores 84a . . . 84d shown in FIG. 1B, utilizing the first engagement data 30a of the first client device 20a because the first device score 84a is greater than a threshold, and discarding the second engagement data 30b of the second client device 20b because the second device score 84b is less than the threshold.

As represented by block 530d, in some implementations, the engagement criterion indicates a drug delivery preference (e.g., a treatment delivery preference) of a healthcare provider attending the first event, and the first content item relates to the drug delivery preference indicated by the engagement criterion. In some implementations, the method 500 includes obtaining the drug delivery preference of the healthcare provider from a remote data source (e.g., from the healthcare management system 90 shown in FIGS. 1C and 2C). For example, the method 500 includes obtaining the prescription data 94 (e.g., the drug delivery preference 96) and utilizing the prescription data 96 to generate the relevance scores for the content items 52.

As represented by block 540, in some implementations, the method 500 includes rendering, by the device, the first content item at a second time that occurs prior to the first time. As represented by block 540a, in some implementations, the method 500 includes displaying the first content item on a display coupled with the device. As represented by block 540b, in some implementations, the method 500 includes transmitting the first content item to another device that displays the first content item at the second time (e.g., transmitting the push notification 60 to the fourth client device 20d shown in FIG. 1A).

Figure 6B:
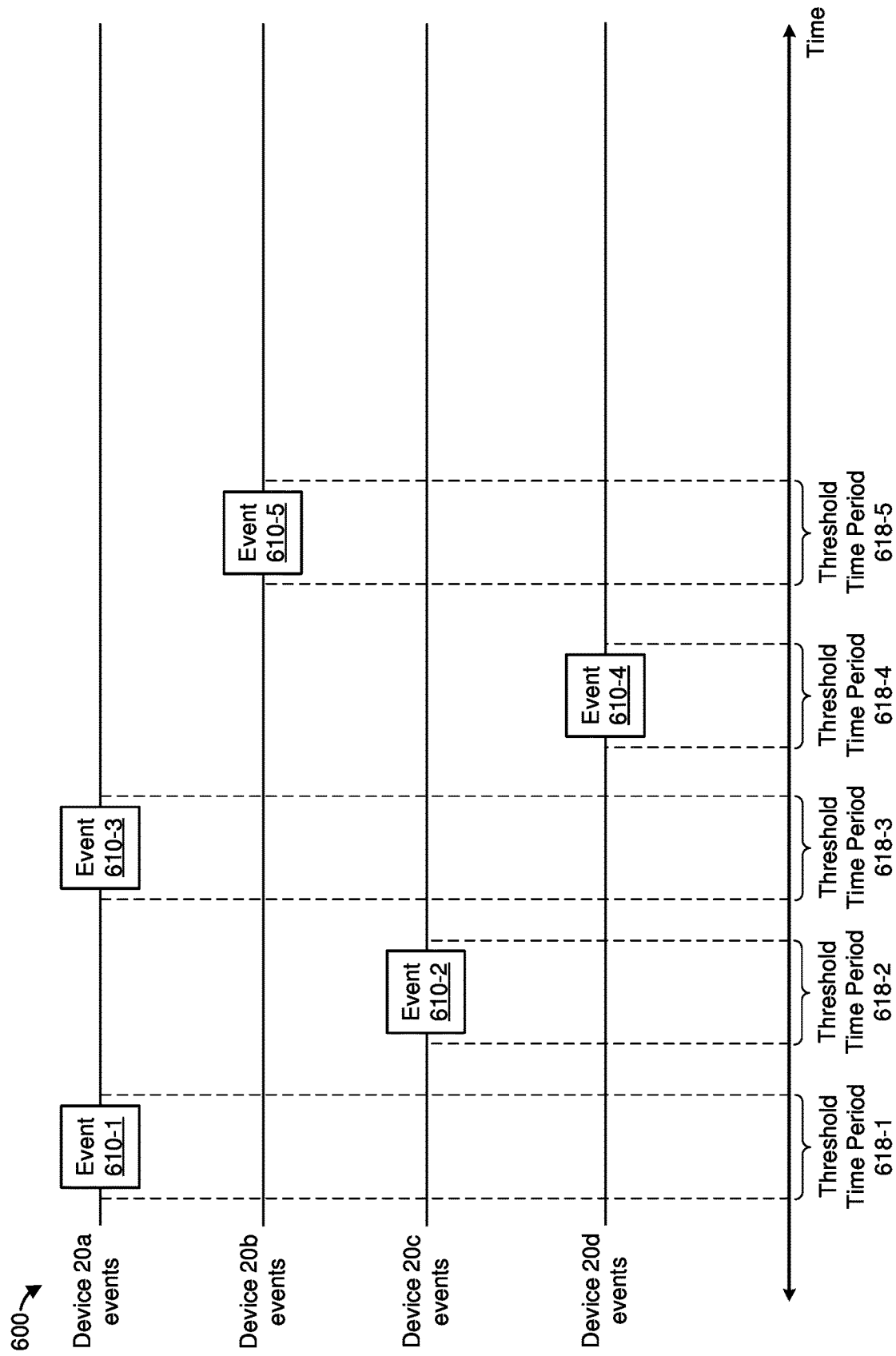

FIGS. 6A-6F are diagrams 600 illustrating event-driven content recommendation in accordance with some implementations. Referring to FIG. 6A, the first client device 20a is associated with a first event 610-1. The first event 610-1 is associated with an event duration 612-1 (e.g., an event length), a pre-event period 614-1, and a post-event period 616-1. The event duration 612-1, the pre-event period 614-1 and the post-event period 616-1 collectively form a first threshold time period 618-1 associated with the first event 610-1. The first engagement data 30a (shown in FIGS. 1A-2C) indicates engagement of the first client device 20a with the content items 52 during the first threshold time period 618-1. The pre-event period 614-1 refers to an amount of time that occurs immediately prior to the start of the first event 610-1 (e.g., 1 hour/day prior to the first event 610-1). The post-event period 616-1 refers to an amount of time that occurs immediately after the end of the first event 610-1 (e.g., the first 1 hour/day after the first event 610-1).

Referring to FIG. 6B, the third client device 20c is associated with a second event 610-2. The third engagement data 30c indicates engagement of the third client device 20c with the content items 52 during a second threshold time period 618-2 associated with the second event 610-2. Similar to the first threshold time period 618-1, in some implementations, the second threshold time period 618-2 includes a duration of the second event 610-2, a pre-event period that occurs prior to the second event 610-2, and a post-event period that occurs after the second event 610-2.

In the example of FIG. 6B, the first client device 20a is associated with a third event 610-3. The first engagement data 30a indicates engagement of the first client device 20a during a third threshold time period 618-3 associated with the third event 610-3. Similar to the first threshold time period 618-1, in some implementations, the third threshold time period 618-3 includes a duration of the third event 610-3, a pre-event period that occurs prior to the third event 610-3, and a post-event period that occurs after the third event 610-3.

The fourth client device 20d is associated with a fourth event 610-4. The fourth event 610-4 is associated with a fourth threshold time period 618-4. In the example of FIG. 6B, the fourth engagement data 30d indicates engagement of the fourth client device 20d with the content items 52 during the fourth threshold time period 618-4. Similar to the first threshold time period 618-1, in some implementations, the fourth threshold time period 618-4 includes a duration of the fourth event 610-4, a pre-event period that occurs prior to the fourth event 610-4, and a post-event period that occurs after the fourth event 610-4.

The second client device 20b is associated with a fifth event 610-5. The fifth event 610-5 is associated with a fifth threshold time period 618-5. In the example of FIG. 6B, the second engagement data 30b indicates engagement of the second client device 20b with the content items 52 during the fifth threshold time period 618-5. Similar to the first threshold time period 618-1, in some implementations, the fifth threshold time period 618-5 includes a duration of the fifth event 610-5, a pre-event period that occurs prior to the fifth event 610-5, and a post-event period that occurs after the fifth event 610-5.

Figure 6C:
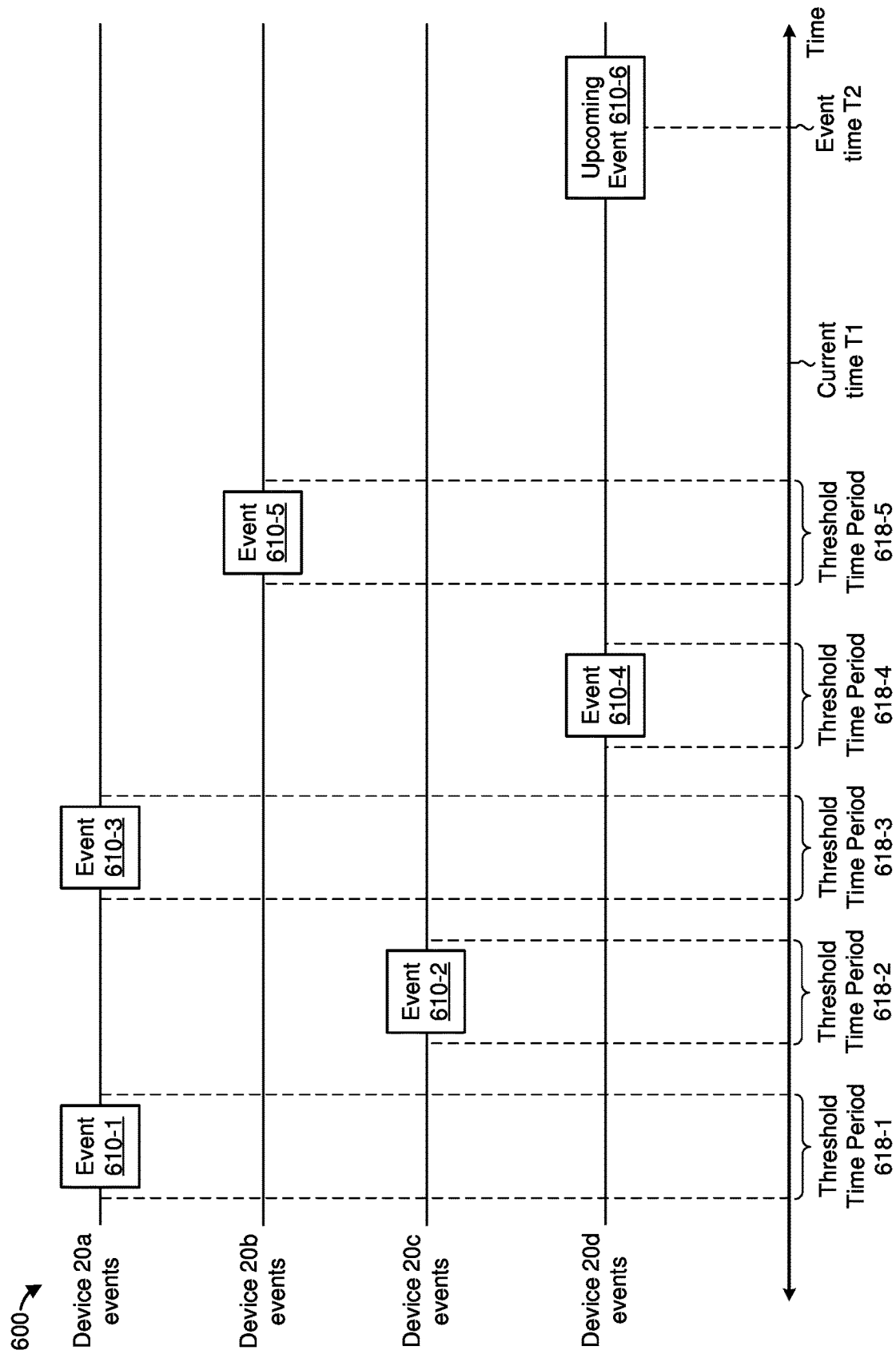

Referring to FIG. 6C, an upcoming event 610-6 is detected in association with the fourth client device 20d. For example, the upcoming event 610-6 is retrieved from the calendar application 22 of the fourth client device 20d. The upcoming event 610-6 occurs at time T2 which is after a current time T1. In the example of FIG. 6C, the events 610-1, 610-2, 610-3, 610-4 and 610-5 are past events, while the upcoming event 610-6 is a future event.

Figure 6D:
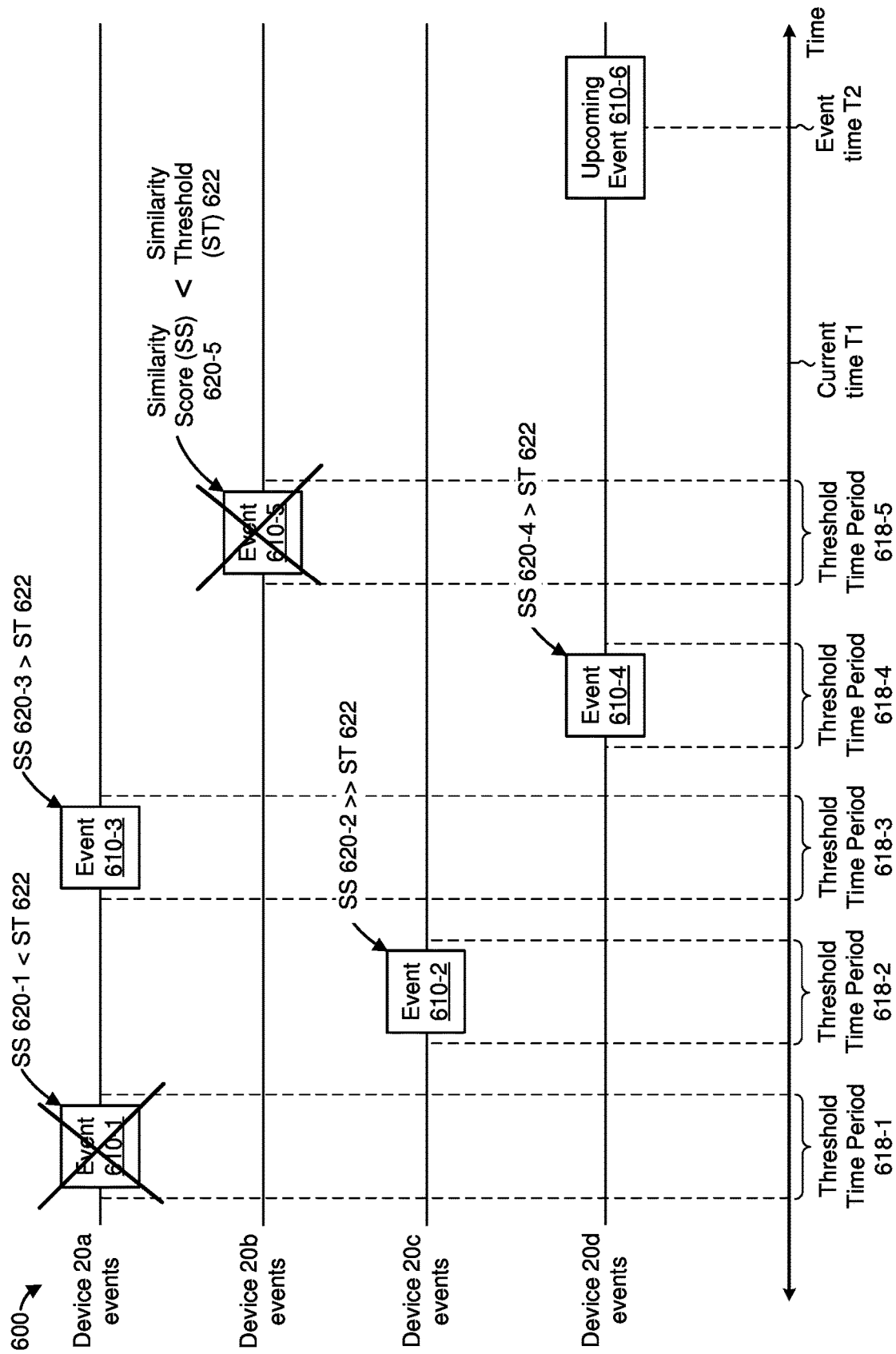

Referring to FIG. 6D, as discussed herein, in some implementations, the server 100 (e.g., the content identifier 130) identifies past events that are similar to the upcoming event 610-6. In the example of FIG. 6D, the server 100 computes respective similarity scores indicating a degree of similarity between corresponding past events and the upcoming event 610-6. For example, the server 100 computes a first similarity score 620-1 indicating a degree of similarity between the first event 610-1 and the upcoming event 610-6. Similarly, the server 100 computes a second similarity score 620-2 indicating a degree of similarity between the second event 610-2 and the upcoming event 610-6. The server 100 computes a third similarity score 620-3 indicating a degree of similarity between the third event 610-3 and the upcoming event 610-6. The server 100 computes a fourth similarity score 620-4 indicating a degree of similarity between the fourth event 610-4 and the upcoming event 610-6 The server 100 computes a fifth similarity score 620-5 indicating a degree of similarity between the fifth event 610-5 and the upcoming event 610-6.

As discussed herein, in some implementations, the server 100 discards engagement data associated with past events that are not within a degree of similarity to the upcoming event 610-6. In some implementations, the server 100 discards engagement data associated with past events that have a similarity score which is lower than a similarity threshold 622. In the example of FIG. 6D, the server 100 discards the first event 610-1 because the first similarity score 620-1 is lower than the similarity threshold 622. Similarly, the servers 100 discards the fifth event 610-5 because the fifth similarity score 620-5 is lower than the similarity threshold 622. Since the similarity scores 620-2, 620-3 and 620-4 of the second event 610-2, the third event 610-3 and the fourth event 610-4, respectively, are greater than the similarity threshold 622, the server 100 utilizes the engagement data associated with the second event 610-2, the third event 610-3 and the fourth event 610-4 to recommend content for the upcoming event 610-6.

In some implementations, the server 100 assigns different weights to engagement data associated with different events. For example, in some implementations, the server 100 assigns a greater weight to engagement data for events with similarity scores that are significantly greater than the similarity threshold 622 (e.g., a similarity score that exceeds the similarity score 622 by a particular amount such as by 100% or more). In the example of FIG. 6D, the server 100 assigns greater weight to engagement data associated with the second event 610-2 because the second similarity score 620-2 is significantly greater than the similarity threshold 622.

Figure 6E:
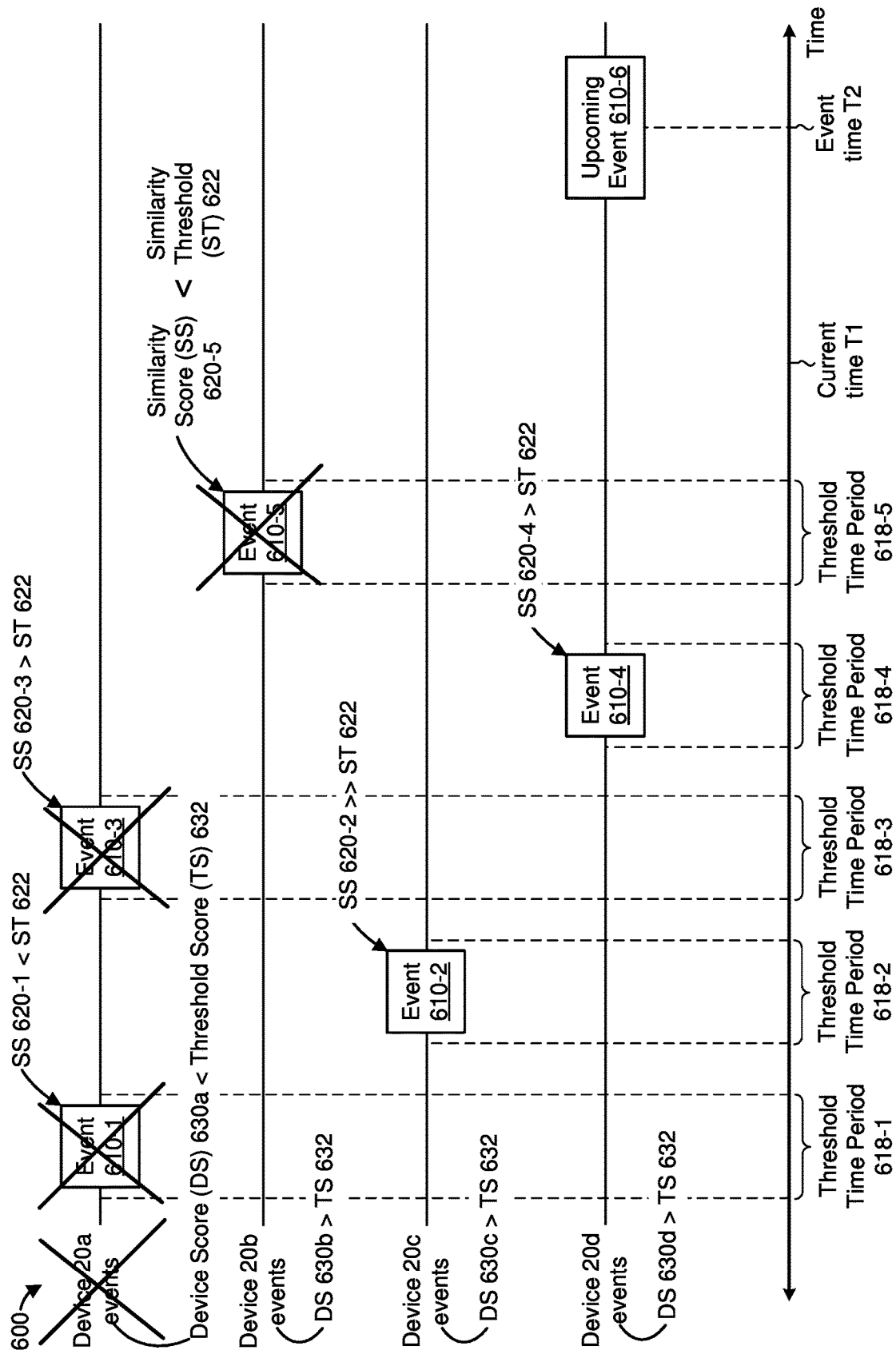

Referring to FIG. 6E, as discussed herein, in some implementations, the server 100 (e.g., the content identifier 130) discards engagement data for client devices with device scores that are less than a threshold. In the example of FIG. 6E, the first client device 20a is associated with a first device score 630a (e.g., the first device score 84a shown in FIGS. 1B and 2B). The second client device 20b is associated with a second device score 630b (e.g., the second device score 84b shown in FIGS. 1B and 2B). The third client device 20c is associated with a third device score 630c (e.g., the third device score 84c shown in FIGS. 1B and 2B). The fourth client device 20d is associated with a fourth device score 630d (e.g., the fourth device score 84s shown in FIG. 1B and 2B). In the example of FIG. 6E, the server 100 discards the engagement data for the first client device 20a because the first device score 630a is less than a threshold score 632. However, the server 100 utilizes the engagement data for the second, third and fourth client devices 20b, 20c and 20d, respectively, because their respective devices scores 630b, 630c and 630d are greater than the threshold score 632.

Figure 6F:
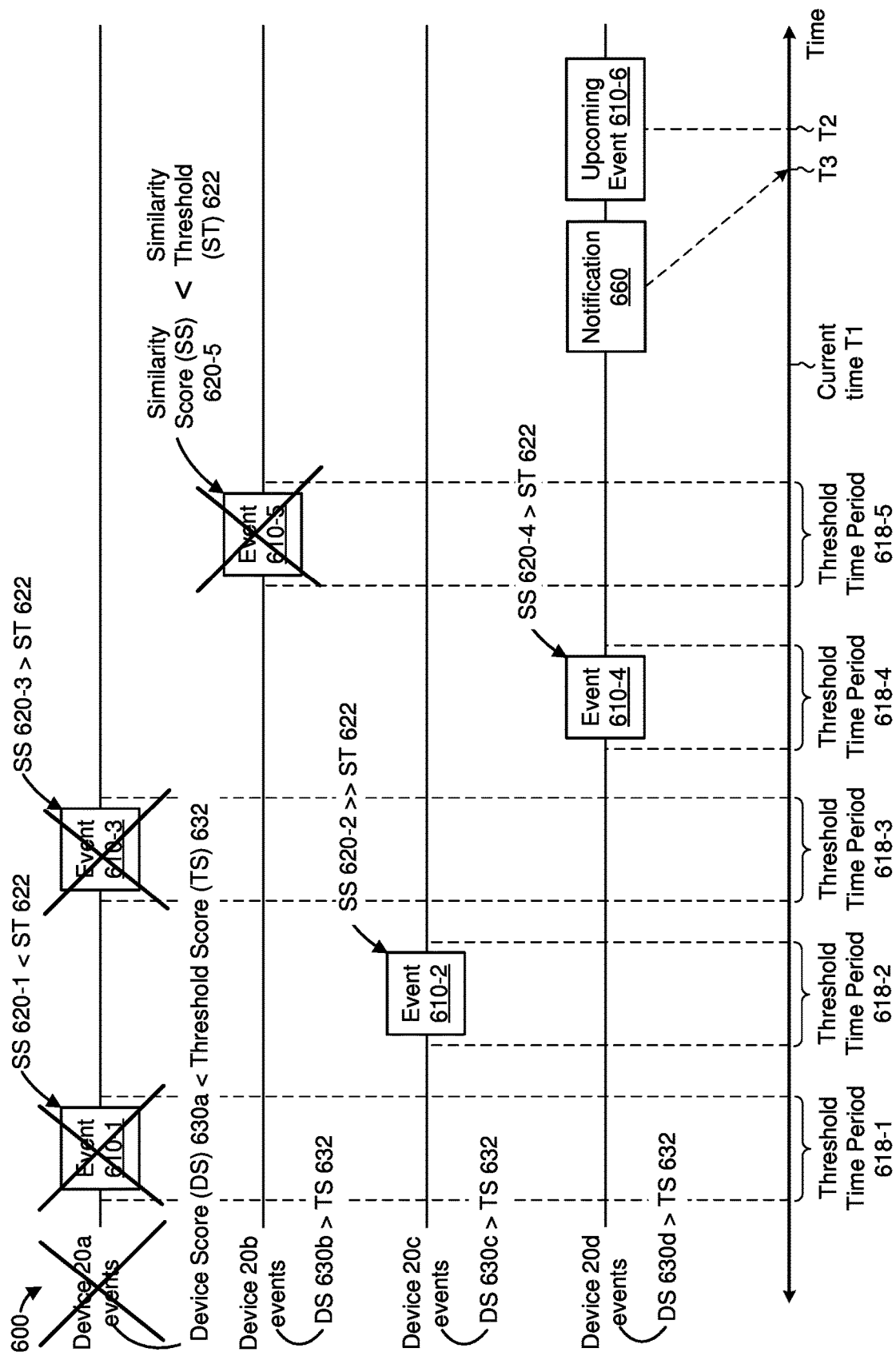

Referring to FIG. 6F, the server 100 sends a notification 660 (e.g., the push notification 60) to the fourth client device 20d. The server 100 transmits the notification 660 to the fourth client device 20d at time T3 which occurs before time T2.

In some implementations, a healthcare provider refers to an operator (e.g., a human operator, a robot, a machine and/or equipment) that administers a treatment (e.g., provides care) to a patient. In some implementations, the healthcare provider refers to a healthcare provider system (e.g., a neural network system) that synthesizes (e.g., automatically generates) treatment plans for patients. For example, in some implementations, the healthcare provider includes a machine that detects medical symptoms of a patient via various medical sensors, and utilizes one or more of the content items 52 from the content datastore 50 to generate a treatment plan for the patient. In various implementations, recommending content that is relevant to an upcoming event improves a performance of the healthcare provider. For example, in some implementations, the upcoming event is an appointment with a patient (e.g., a patient consultation), and the healthcare provider utilizes the recommended content to generate a treatment plan for the patient. In some implementations, the recommended content allows the healthcare provider to generate a treatment plan that is more likely to cure the patient thereby improving patient outcomes. In some implementations, the recommended content is selected based on information corresponding to the patient associated with the upcoming event (e.g., the recommended content is selected based on stored patient history information). In some implementations, the recommended content for an upcoming patient appointment is selected based on content that other healthcare providers engaged with during or within a threshold amount of time of past patient appointments that are within a degree of similarity to the upcoming patient appointment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first" "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including a non-transitory memory and one or more processors coupled with the non-transitory memory:
detecting an upcoming patient consultation between a patient and a healthcare provider;
prior to the upcoming patient consultation:
obtaining patient history information for the patient;
obtaining engagement data that indicates which of a plurality of content items stored in a content datastore were accessed by other healthcare providers prior to, during or after past patient consultations that are similar to the upcoming patient consultation;
generating respective relevance scores for the plurality of content items based on the patient history information and the engagement data; and
selecting a first content item from the plurality of content items stored in the content datastore in response to the first content item having one of the respective relevance scores that is greater than a remainder of the respective relevance scores; and
presenting the first content item as a recommended content item to the healthcare provider prior to the upcoming patient consultation.

2. The method of claim 1, wherein presenting the first content item as the recommended content item comprises:
transmitting the first content item or a link to the first content item to a healthcare provider device used by the healthcare provider.

3. The method of claim 1, wherein presenting the first content item as the recommended content item further comprises:
transmitting the first content item or a link to the first content item to a patient device used by the patient.

4. The method of claim 1, further comprising:
utilizing the first content item to generate a treatment plan for the patient.

5. The method of claim 1, wherein the patient history information indicates a medical condition of the patient and the first content item provides a treatment plan for the medical condition.

6. The method of claim 1, wherein the first content item provides information regarding a pharmaceutical drug or a medical device that can be used to treat a medical condition of the patient.

7. The method of claim 1, further comprising:
obtaining prescription data that indicates a drug delivery preference of the healthcare provider; and
generating the respective relevance scores based further on the prescription data.

8. A device comprising:
one or more processors;
a non-transitory memory; and
one or more programs stored in the non-transitory memory, which, when executed by the one or more processors, cause the device to:
detect an upcoming patient consultation between a patient and a healthcare provider;
prior to the upcoming patient consultation:
obtain patient history information for the patient;
obtain engagement data that indicates which of a plurality of content items stored in a content datastore were accessed by other healthcare providers prior to, during or after past patient consultations that are similar to the upcoming patient consultation;
generate respective relevance scores for the plurality of content items based on the patient history information and the engagement data; and
select a first content item from the plurality of content items stored in the content datastore in response to the first content item having one of the respective relevance scores that is greater than a remainder of the respective relevance scores; and present the first content item as a recommended content item to the healthcare provider prior to the upcoming patient consultation.

9. The device of claim 8, wherein presenting the first content item as the recommended content item comprises:

transmitting the first content item or a link to the first content item to a healthcare provider device used by the healthcare provider.

10. The device of claim 8, wherein presenting the first content item as the recommended content item further comprises:

transmitting the first content item or a link to the first content item to a patient device used by the patient.

11. The device of claim 8, wherein the patient history information indicates a medical condition of the patient and the first content item provides a treatment plan for the medical condition.

12. The device of claim 8, wherein the first content item provides information regarding a pharmaceutical drug or a medical device that can be used to treat a medical condition of the patient.

13. The device of claim 8, wherein the one or more programs further cause the device to:

obtain prescription data that indicates a drug delivery preference of the healthcare provider; and generate the respective relevance scores based further on the prescription data.

14. A non-transitory memory storing one or more programs, which, when executed by one or more processors of a device, cause the device to:

detect an upcoming patient consultation between a patient and a healthcare provider;

prior to the upcoming patient consultation:

obtain patient history information for the patient;

obtain engagement data that indicates which of a plurality of content items stored in a content datastore were accessed by other healthcare providers prior to, during or after past patient consultations that are similar to the upcoming patient consultation;

generate respective relevance scores for the plurality of content items based on the patient history information and the engagement data; and select a first content item from the plurality of content items stored in the content datastore in response to the first content item having one of the respective relevance scores that is greater than a remainder of the respective relevance scores; and present the first content item as a recommended content item to the healthcare provider prior to the upcoming patient consultation.

15. The non-transitory memory of claim 14, wherein presenting the first content item as the recommended content item comprises:

transmitting the first content item or a link to the first content item to a healthcare provider device used by the healthcare provider.

16. The non-transitory memory of claim 14, wherein presenting the first content item as the recommended content item further comprises:

transmitting the first content item or a link to the first content item to a patient device used by the patient.

17. The non-transitory memory of claim 14, wherein the one or more programs further cause the device to:

utilize the first content item to generate a treatment plan for the patient.

18. The non-transitory memory of claim 14, wherein the patient history information indicates a medical condition of the patient and the first content item provides a treatment plan for the medical condition.

19. The non-transitory memory of claim 14, wherein the first content item provides information regarding a pharmaceutical drug or a medical device that can be used to treat a medical condition of the patient.

20. The non-transitory memory of claim 14, wherein the one or more programs further cause the device to:

obtain prescription data that indicates a drug delivery preference of the healthcare provider; and generate the respective relevance scores based further on the prescription data.

\* \* \* \* \*